United States Patent [19]

Iwamura

[11] Patent Number: 5,313,530
[45] Date of Patent: May 17, 1994

[54] CALCULATING APPARATUS AND METHOD OF ENCRYPTING/DECRYPTING COMMUNICATION DATA BY USING THE SAME

[75] Inventor: Keiichi Iwamura, Kawasaki, Japan
[73] Assignee: Canon Kabushiki Kaisha, Tokyo, Japan
[21] Appl. No.: 847,672
[22] Filed: Mar. 4, 1992
[30] Foreign Application Priority Data

Mar. 5, 1991 [JP] Japan .................................. 3-038664
Mar. 6, 1991 [JP] Japan .................................. 3-040115
Sep. 5, 1991 [JP] Japan .................................. 3-225986

[51] Int. Cl.$^5$ .......................... H04L 9/30; G06F 7/52
[52] U.S. Cl. ..................................... 380/28; 380/30; 364/746
[58] Field of Search ............... 380/28, 30; 364/746, 364/754; 371/37

[56] References Cited

U.S. PATENT DOCUMENTS

| 4,538,238 | 8/1975 | Circello et al. | 364/746 |
| 4,555,769 | 11/1985 | Carter et al. | 364/746 |
| 4,709,345 | 11/1987 | Vu | 364/746 |
| 4,747,103 | 5/1988 | Iwamura et al. | 371/37 |
| 4,949,293 | 8/1990 | Kawamura et al. | 364/746 |
| 4,996,527 | 2/1991 | Houk et al. | 364/746 |
| 5,101,431 | 3/1992 | Even | 380/30 |

OTHER PUBLICATIONS

"A Programmable VLSI Architecture for Computing Multiplication and Polynomical Evaluation Modulo a Positive Integer", IEEE Journal of Solid State Circuits, vol. 23, No. 1, Feb. 1988, New York, US, pp. 204–207.
"A Fast Modular–multiplication Algorithm Based on a Radix 4 and Its Application", Transaction of the Institute of Electronics and Communication Engineeers of Japan, Section E. vol. E73, No. 7, Jul. 1990, Tokyo, Japan, pp. 1081–1086.
"VLSI Design for Exponentiation in GF(2**n)", AUS-CRYPT '90, Int. Conf. on Cryptology, Jan. 1990, Sidney, Australia, p. 398.
"An Algorith for Modular Exponentiation", Proceedings 5th Symp. on Comp. Arithmetic, May 18–19, Michigan, USA, pp. 135–136.
IEEE Trans on Computers, vol. C–34, No. 7 C7/85) Vu "Efficient Implimentation of the Chinese Remainder Theorem for Sign Detection and Residue Decoding".

*Primary Examiner*—Salvatore Cangialosi
*Attorney, Agent, or Firm*—Fitzpatrick, Cella, Harper & Scinto

[57] ABSTRACT

A modular multiplication of integers of large digits can be calculated at high speed although the size of the circuit can be reduced. Furthermore, encryption/decryption for a communication by using cryptograph is performed by using it.

In order to achieve this, when the modular multiplication is executed by alternately repeating a partial sum of product calculation and the residue calculation, a portion of the result of the previous calculation larger than the maximum digit of a number which is the modulo of this residue calculation is subjected to the residue calculation in the intermediate stage. Furthermore, the residue is directly obtained from the result of the previous calculation and the partial sum of product calculation is performed in such a manner that an obtained residue is added in place of a portion of the result of the previous calculation larger than the maximum digit of the modulo of this residue calculation. Furthermore, the additions are performed by a plurality of adders in parallel and a carry generated in each adder is added at the next addition performed by each upper adder. This circuit is formed into a systolic array composed by the same processing elements to realize the aforesaid calculation by a pipeline process.

15 Claims, 28 Drawing Sheets

CALCULATING APPARATUS AND METHOD OF ENCRYPTING/DECRYPTING COMMUNICATION DATA BY USING THE SAME

BACKGROUND OF THE INVENTION

1. Field of the Invention

The present invention relates to a calculating apparatus for performing calculations in such a manner that two integers are multiplied and its result is divided by another integer to obtain the residue, that is integers A, B and N are subjected to a modular multiplication A·B mod N. More particularly, the present invention relates to a calculating apparatus for performing a modular multiplication of large digit integers suitable for use in a cryptographic scheme such as an RSA cryptosystem.

Also the present invention relates to a communication method which uses the aforesaid calculating apparatus for executing encryption of the contents transmitted and decryption of the cryptogram received and which is used in various communication services such as the home banking, farm banking, electronic mail and the electronic post services in a computer network.

2. Description of the Related Art

Recently, a cryptographic scheme for protecting the content of data has become important with a remarkable advance in an information communication system which uses a computer network. In particular, a high speed cryptographic scheme has become necessary with the tendency of increasing the speed in the network and enlarging its capacity.

Hitherto, it has been known that the encryption methods are classified into a public-key cryptosystem and a common-key cryptosystem. Among others, the public-key criptosystem has been attracting attention because of its advantages that the administration of its key can easily be performed and the digital signature can be performed as compared with the common-key cryptosystem.

An RSA cryptography is a typical cryptograph of the public-key cryptosystem and is considered to be the most advantageous public-key cryptograph.

The RSA cryptography is calculated by a modular exponentiation: $C = M^e \mod N$ (where C, M, N and e are integers). The modular exponentiation can be performed by repeating modular multiplications: $D = A \cdot B \mod N$ (where A, B and D are integers). However, since N and e must be 512 bits or more to secure the safety against unlawful cryptanalysis in the RSA cryptography, a problem of an excessively large computational complexity arises.

Hitherto, the types of the modular multiplication circuit for large digit integers that perform a calculation of $R = A \cdot B \mod N$ by using integers A, B and N are basically classified into two methods. One of them is performed by dividing the modular multiplication into a multiplication: $C = A \cdot B$ and a residue calculation: $D = C \mod N$. Another method is performed by, n times, subjecting $a_{n-i}$ ($i = 1, \ldots, n$) divided by A for each bit to a partial product and residue calculations in each of which $R = 2 \cdot R + a_{n-i} \cdot B \mod N$ ($i = 1 \ldots N$) is performed.

The former method exhibits advantages in that the structure can be relatively simplified and the control can be easily performed because of its structure usually having a multiplying circuit and a residue calculation circuit formed into a pipeline. However, there arises a problem in that a desired apparatus cannot be realized with a small circuit because the aforesaid method must have a memory for temporarily storing multiplication result C and a multiplying circuit and a residue calculation circuit must be separated.

On the other hand, the latter method exhibits an advantage in that the size of the circuit can be considerably reduced because its process comprises the steps of the partial product calculation and the residue calculation of the result of the partial product calculation. However, problems arise in that a delay time generated due to the carry involved in the partial product and residue calculations cannot be eliminated, the size of the carrying bit register cannot be reduced, and a discrimination whether or not $R > N$ must be made for a residue calculation with modulo N.

Another problem takes place in that the processing speed will be decreased due because it is necessary to provide clocks or more in each multiplication steps because the multiplication is usually performed by adding B to $2 \cdot R$ in only a case where $a_{n-i} = 1$.

In a case where the aforesaid problems are desired to be overcome by providing a large-digit multiplier and a divisor which must be used in a case where an assumption is made that the division $a_{n-i}$ of A is plural bits, there arises another problem in that there is no ROM and a cell-library with which the aforementioned large-digit multiplier and the divisor can be realized. If the large-digit multiplier and the divisor are designed, a problem arises in that the desired circuit is too complex in its structure in a case where the structure of the circuit for a small-digit multiplier and that of the divisor are simply expanded.

As described above, the conventional method suffers from a variety of problems, so that an efficient modular multiplication circuit has not been realized as yet.

SUMMARY OF THE INVENTION

Accordingly, an object of the present invention is to provide a calculating apparatus capable of overcoming the aforesaid problems and efficiently performing a modular multiplication of integers of large digits at high speed with a small circuit size and a communication method for cryptograph/decryptograph by using it.

Another object of the present invention is to provide a calculating apparatus capable of eliminating a necessity of discriminating the intermediate result of whether or not $R > N$ in a method in which a modular multiplication is performed by repeating a calculation of a partial sum of products and a residue calculation of the result of this.

Another object of the present invention is to provide a calculating apparatus capable of eliminating a delay time generated due to a carry in a method in which a modular multiplication is performed by repeating a calculation of a partial sum of products and a residue calculation of the result of this.

Another object of the present invention is to provide a calculating apparatus having a register for a carry bit which is commonly used as another register and thereby an exclusive register can be omitted in a method in which a modular multiplication is performed by repeating a calculation of a partial sum of products and a residue calculation of the result of this.

Another object of the present invention is to provide a calculating apparatus in which a modular multiplication is constituted by a plurality of identical processing elements and which is thereby capable of satisfactorily integrating a circuit.

According to one aspect, the present invention which achieves these objectives relates to a calculating apparatus for calculating a residue obtained by dividing a product of a first integer and a second integer by a third integer, comprising: storage means for holding a value; multiplying means for sequentially receiving the first integer by a predetermined number of bits to multiply it into the second integer; and calculating means for adding an input supplied from the storage means and an input supplied from the multiplying means, subjecting a portion of an input value supplied from the storage means larger than the maximum digit of the third integer to a calculation in which a residue is obtained by the third integer, and transmitting its result to the storage means.

According to another aspect, the present invention which achieves these objectives relates to a calculating apparatus for calculating a residue obtained by dividing a product of a first integer and a second integer by a third integer, comprising: a plurality of storage means for holding values; a plurality of multiplying means for sequentially receiving the first integer by a first predetermined number of bits to multiply it into the second integer divided in a second predetermined number of bits unit; calculating means for obtaining a second residue obtained by dividing, by the third integer, a portion of values stored in a plurality of the storage means larger than the maximum digit of the third integer when upward shifting by a degree corresponding to the first predetermined number of bits is performed; and a plurality of adding means for adding an input supplied from at least one of a plurality of the storage means, an input supplied from at least one of a plurality of the multiplying means and an input supplied from the calculating means and transmitting the result of the addition to a plurality of the storage means.

According to another aspect, the present invention which achieves these objectives relates to a calculating apparatus for calculating a residue obtained by dividing a product of integers A and B by an integer N including a plurality of processing elements, each of a plurality of the processing elements comprising: storage means for holding a value and transmitting it to another processing element; input means for receiving an output from the other processing element; multiplying means for multiplying a portion of the integer A divided for a first predetermined number of bits and the integer B divided for a second predetermined number of bits; calculating means for obtaining a predetermined digit portion of a second residue obtained by dividing, by the integer N, a portion of values stored in a plurality of the storage means of a plurality of the processing elements larger than the maximum digit of the integer N when upward shifting by a degree corresponding to the first predetermined bit is performed; and adding means for adding the output from the multiplying means and the output from the calculating means to each other to transmit the result to the storage means.

According to another aspect, the present invention which achieves these objectives relates to a communication method for obtaining cryptogram $C = M^e \bmod N$ for information M to be transmitted from given integers e and N by a repetition of modular multiplication of two numbers while making N to be a modulo to transmit a cryptograph C, the communication method comprising steps of: sequentially receiving a first integer by a predetermined number of bits to multiply it into a second integer; obtaining a residue by dividing, by the integer N, a portion of a value stored in a register larger than the maximum digit of the integer N when an upward shifting by a degree corresponding to the predetermined number of bit is performed; adding a result of the multiplication, a portion of a value stored in a register and is not larger than the maximum digit of the integer N when upward shifting by a degree corresponding to a predetermined number of bits is performed and the residue to one another; and storing the result of the addition in the register.

According to another aspect, the present invention which achieves these objectives relates to a communication method in which information $M = C^d \bmod N$ about a received cryptography C is obtained from given integers d and N by a repetition of modular multiplication of two numbers while making N to be a modulo to decryptograph cryptograph C into information M, the communication method comprising steps of: sequentially receiving a first integer for each predetermined number of bits to multiply it to a second integer; obtaining a residue by dividing, by the integer N, a portion of a value stored in a register larger than the maximum digit of the integer N when an upward shifting by a degree corresponding to the predetermined bit is performed; adding a result of the multiplication, a portion of a value stored in a register and is not larger than the maximum digit of the integer N when upward shifting by a degree corresponding to a predetermined number of bits is performed and the residue to one another; and storing the result of the addition in the register.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 24 to 26 and 28 illustrate structural examples of the PE for performing the modular multiplication for the RSA cryptogram.

DESCRIPTION OF THE PREFERRED EMBODIMENTS

Figure 1:
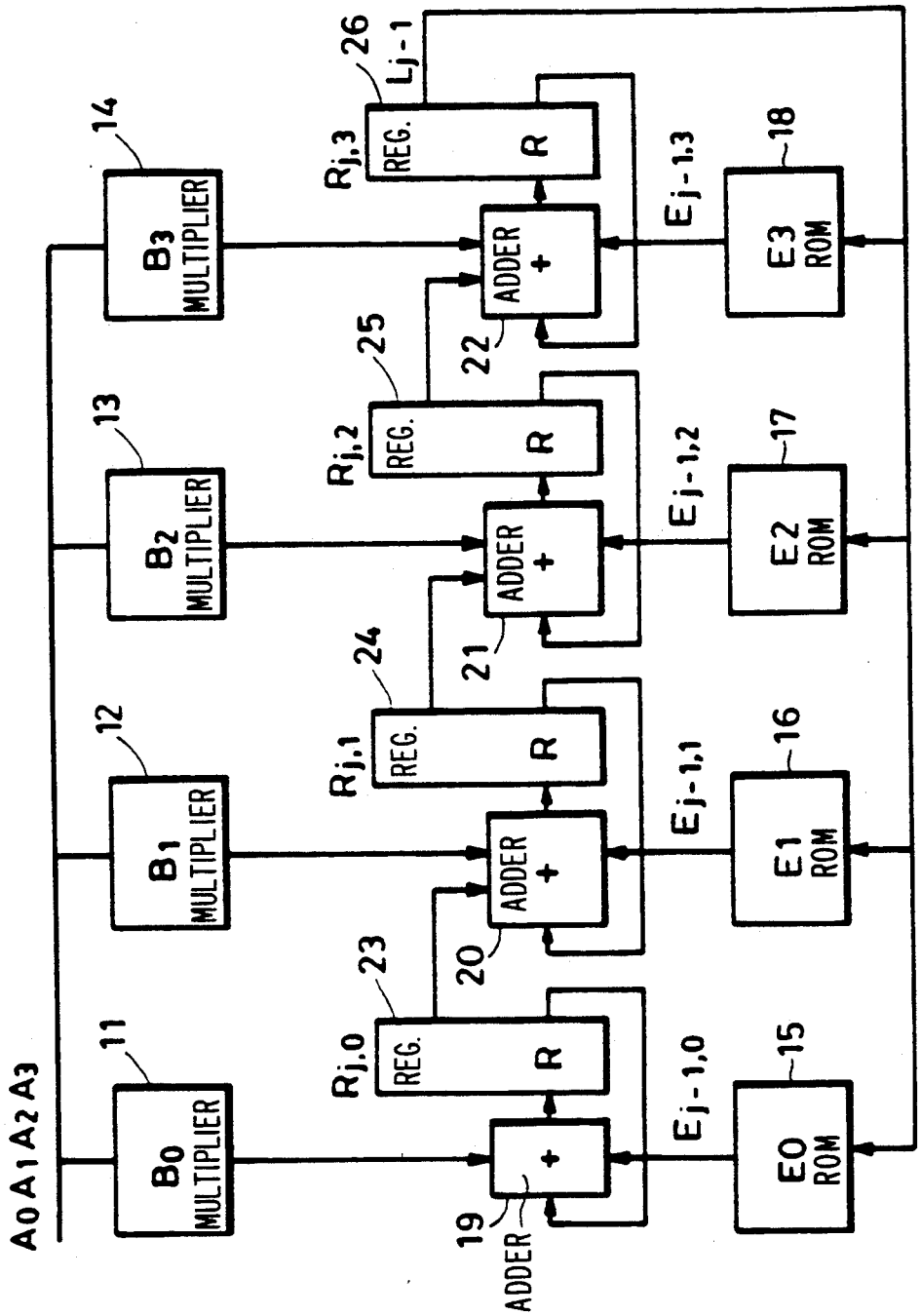
FIGS. 1 to 10 illustrate the structural examples of a modular multiplication circuit.

Preferred embodiments of the present invention will now be described with reference to the drawings.

First, a communication method in which an RSA cryptograph will now be described. Assuming that a plain text to be communicated is M, a cryptogram is C, a public cryptogram key is e, a decryption key is d, and a public modulo is N, the encryption and the decryption are expressed by the following modular exponentiations:

Encryption: $C = M^e \bmod N$
Decryption: $M = C^d \bmod N$

Therefore, the encryption and the decryption of the RSA cryptograph can be executed by similar modular exponentiation circuits. Then, the description will be made about the encryption.

Although the modular exponentiation: $C = M^e \bmod N$ can be performed by simply, repeating modular multiplications of two numbers, the computational complexity is too large in a case where M and e have large quantities. Therefore, the present invention is arranged in such a manner that the calculations are carried out in accordance with the following algorithm:

```
Algorithm (O)
INPUT M, e, N                          (input)
C = 1                                  (initialization)
FOR i = k TO 1
    IF e_i = 1 THEN C = C · M mod N    (calculation 1)
    IF i > 1 THEN C = C · C mod N      (calculation 1)
NEXT
``` where e is an integer of k bits and is expressed by $e = e_k, e_{k-1}, \ldots, e_2, e_1$.

Therefore, the modular exponentiation can be realized by repeating the modular multiplication $C = C \cdot B \bmod N$ (B is M or C). Then, a circuit capable of efficiently performing the aforementioned modular multiplication will now be described.

STRUCTURAL EXAMPLE 1 OF THE MODULAR MULTIPLICATION CIRCUIT

Assumptions are made here that integer A is an $n_a$ bit number, integer B is an $n_b$ bit number, integer N is an $n_n$ bit number and the following relations are held for simplifying the structure: $n_a = n$, $n_b = n_n = n \cdot m$.

A case will be considered in which a calculation of $A \cdot B \bmod N = R$ is performed. As is well known that a multiplier for performing a multiplication $a \cdot b = c$, where each of a and b is a 1 bit number, can be realized by an AND circuit.

A, B and N respectively divided for 1, m and m bits can be expressed as follows:

$$A = A_{n-1} \cdot 2^{n-1} + A_{n-2} \cdot 2^{n-2} + \ldots + A_1 \cdot 2 + A_0$$

$$B = B_{n-1} \cdot X^{n-1} + B_{n-2} \cdot X^{n-2} + \ldots + B_1 \cdot X + B_0$$

$$N = N_{n-1} \cdot X^{n-1} + N_{n-2} \cdot X^{n-2} + \ldots + N_1 \cdot X + N_0$$

where $X = 2^m$.

In this case, A, B and N can be assumed to be polynomials and thereby $R = A \cdot B \bmod N$ can be expressed as follows:

$$R = A \cdot B - Q \cdot N \quad (Q = [A \cdot B / N])$$

where [Z] is a maximum integer which is not larger than Z.

Therefore, R can be obtained from the following process:

```
Algorithm A
R_0 = 0
    FOR j = 1 TO n
        R_j = R_{j-1} · 2 + A_{n-j} · B − Q_{j-1} · N
            = R_{j-1} · 2 + A_{n-j} · B + E_{j-1} − L_{j-1} · X^n
    NEXT
IF R_n > N THEN R_n = R_n − Q_n · N
where L_{j-1} = [2R_{j-1}/X^n]
      Q_{j-1} = [L_{j-1} · X^n/N], Q_n = [R_n/N]
      L_{j-1} · X^n = Q_{j-1} · N + E_{j-1} (E_{j-1} < N)
```

The algorithm is arranged in such a manner that the value of $R_{j-1} \cdot 2$, that is $L_{j-1} \cdot X^n = [R_{j-1} \cdot 2/X^n] \cdot X^n$ which is larger than the maximum digit of N is subjected to mod N (that is, $Q_{j-1} \cdot N = [L_{j-1} \cdot X^n/N] \cdot N$ is subtracted). That is, coefficients of R which are larger than $X^{n-1}$ in terms of bit are subjected to mod N. Therefore, a necessity of making a discrimination $R > N$ can be eliminated.

Furthermore, $L_{j-1} \cdot X^n$ is subtracted as an alternative to performing $-Q_{j-1} \cdot N$ which is $L_{j-1} \cdot X^n \bmod N$ and its residue $E_{j-1}$ is added. That is, the upper portion $L_{j-1} \cdot X^n$ of $R_{j-1} \cdot 2$ is converted into $E_{j-1}$ to be added. Hence, all of the subtractions by means of mod N can be performed by additions. However, although there is a necessity of making a discrimination whether or not $R_n > N$ to perform a calculation $R_n = R_n - Q_n \cdot N$ in this case, it is performed after the aforesaid repeated calculations have been performed. Therefore, the conventional necessity of making the aforesaid discrimination of $R > N$ during the repeated calculations can be eliminated, and thereby it can be performed by another circuit or the like. As a result, the overall processing speed is not lowered.

Then, a method of overcoming the problem of the excessive delay time generated due to the calculation of $R_j$ will now be described. In the algorithm A, decompositions of $R_j$ into $R_{j,n-1}$ and that of B into $B_{n-i}$ to express them by the following algorithm B. Furthermore, carry portion $C_{j,n-1}$ is made to be carries for each m bits, the capacity of the register can be reduced.

```
Algorithm B
FOR j = 1 TO n
    FOR i = 0 TO n
        R_{j,n-1} = D_{j-1,n-i} · 2 + C_{j-1,n-i-1} +
                   A_{n-j} · B_{n-i} + E_{j-1,n-i}
        D_{j,n-1} = dw_{m-1} (R_{j,n-i})
        C_{j,n-1} = up_{m-1} (R_{j,n-i})
    NEXT
NEXT
where R_{j-1,n} · X^n = Q_{j-1} · N + E_{j-1}              (1)
      Q_{j-1} = [R_{j-1,n} · X^n/N]                        (2)
      E_{j-1} = E_{j-1,n-1} · X^{n-1} + ... + E_{j-1,1} · X +   (3)
                E_{j-1,0}
      D_{0,n-1} = C_{0,n-i-1} = E_{0,n-i} = B_n = B_{-1} = 0
      dw_{m-1} (Z): value of 2^{m-1} digits of Z
      up_{m-1} (Z): value obtained by dividing a value of
                    2^m or more digit of Z by 2^m
```

Although the algorithm A and the algorithm B are basically the same, the algorithm B is more suitable to operate the actual circuit. Assuming that $n = 4$, the modular multiplication circuit as shown in FIG. 1 can be constituted in accordance with the algorithm B.

Referring to FIG. 1, reference numerals 11 to 14 represent multiplying circuits for calculating products $A_{4-j} \cdot B_{4-i}$ of 1-bit inputs $A_0$ to $A_3$ and their corresponding m-bit constants $B_0$ to $B_3$ and composed of m ANDs.

Reference numerals 15 to 18 represent ROMs for transmitting values of $E_{j-1,0}$ to $E_{j-1,3}$ obtainable from $R_{j-1,4}$ to predetermined N and m in accordance with Equations (1) to (3). Reference numerals 19 to 22 represents 4-input adders (where reference numeral 19 represents a 3-input adder because a carry from the lower digit is not performed) for adding the output from the multiplying circuit, a lower digit of a right register, the carry of the left register and the output from the ROM to one another. Reference numerals 23 to 26 represent m+2 registers each registering output $R_{j,4-i}$ from the adder.

The lower m−1 bit of the aforesaid register means the lower m−1 digit (dw$_m$ ($R_{j,4-i}$)=$D_{j,4-i}$) of $R_{j,4-i}$, while the upper 3 bits means a value (up$_m$ ($R_{j,4-i}$)=$C_{j,4-i}$) of m digit or more of $R_{j,4-i}$. As a result, the carry of each adder is absorbed at each clock, and then it is added as a carry at the next clock. Therefore, the delay time generated in the calculation of $R_j$ which will be carried out in accordance with the algorithm A can be eliminated.

As described above, $D_{j,4-i}$, $R_{j,4-i}$ and $C_{j,4-i}$ show the states of the registers and subscript j means a clock, where 4−i therefore indicates the position of a circuit changed from i=1 to i=4 from right to left in FIG. 1. Consequently, $R_{0,0}$ means the register positioned in the left end portion of FIG. 1 in the initial state (j=0), while $R_{0,3}$ means the register positioned in the right end portion. Referring to FIG. 1, $L_{j-1}$ means a value which is larger than the maximum digit $X^{n-1}$ of N transmitted from the right end register.

Then, the operation of the circuit shown in FIG. 1 will now be described. Referring to FIG. 1, the initial state ($R_{0,4-i}$) of each registor is made to be 0. Since $R_{0,4-i}$=0 in this state, $D_{0,4-i}$=$C_{0,4-i-1}$=0.

When $A_3$ is supplied at the first clock (j=1), output $A_3 \cdot B_{4-i}$ (i=1 ... 4) for each m bits is transmitted from each multiplier. The values of the outputs are supplied to the corresponding adders before they are stored in the corresponding registers $R_{1,4-i}$ (i=1 ... 4). At this time, the lower m−1 bits of $R_{1,4-i}$ (i=1 ... 4) are made to be $D_{1,4-i}$ and m bits or more are made to be $C_{1,4-i}$ before they are stored in the registers. However, since the result of the calculation of $R_{1,4-i}$ (i=1 ... 4) in a case where j=1 is not larger than $X^{n-1}$, $L_0$=0.

When $A_2$ is supplied at the next clock (j=2), $A_2 \cdot B_{4-i}$ (i=1 ... 4) is similarly transmitted from the aforesaid multiplier. The lower m−1 bits $D_{1,4-i}$ (i=2 ... 4) of the corresponding registers are doubled (shifted by one bit) before they are fed back to the adders. On the other hand, the upper 3 bits $C_{1,4-i-1}$ each register are supplied to the right adder as a carry. Since the right end register $R_{2,3}$ can be sometimes larger than the maximum digits $X^{n-1}$ of N in this state, it is transmitted as $L_1$=up$_m$ ($R_{2,3}$).

When $A_1$ is then supplied at the next clock (j=3), $A_1 \cdot B_{4-i}$ (i=1 ... 4) is transmitted from the upper multiplier to be supplied to the adder similarly to the output $D_{2,4-i}$, $C_{2,4-i-1}$ from the register. At this time, each ROM transmits the value of $E_{2,4-i}$ to each adder when a value of $L_2$, which is larger than the maximum digits $X^{n-1}$ at the previous clock, is received. Therefore, the adders are respectively formed into 4-input adders to transmit m+2 bits, and thereby the register is constituted by m+2 bit registers.

Also in a case where $A_0$ has been supplied at a clock of j=4, an operation similar to that performed when j=3 is carried out. As a result, it can be understood that values $R_{4,0}$ to $R_{4,3}$ stored in the corresponding registers collectively become the residue to be obtained.

As described above, the modular multiplication circuit can be efficiently constituted when the input values are divided before they are supplied. It is apparent from this that the modular multiplication circuit can be constituted in an ordinary case in which na≠n, nb≠n·m and nn≠n·m by a similar circuit structure.

In the aforesaid circuit, the carry is temporarily held by $C_{j,4-i}$, the delay time generated at the time of the array can be eliminated. Therefore, one calculation can be repeated in a short time.

Furthermore, the value $L_{j-1} \cdot X_n$ of $2R_{j-1}$ which is larger than $X^{n-1}$ which is the maximum digit of N is subjected to mod N, the necessity of making a discrimination R>N can be eliminated. Furthermore, $E_{j-1}$, which is $-Q_{j-1} \cdot N = -L_{j-1} \cdot X^n + E_{j-1}$, is added in place of execution of $-Q_{j-1} \cdot N$, so that all of the residue calculations are performed by adding.

In addition, the value of latched $L_{j-1}$ is not allowed to pass through an individual circuit such as an adder but is directly supplied to the ROM which transmits $E_{j-1}$. Therefore, the processing time for one clock can be shortened because the necessity lies in only a time required to pass through the multipliers and the ROMS for performing divisions. Another advantage can be obtained in that the size of the circuit can be reduced and the structure of the same can be simplified because its structure is arranged in such a manner that the register for latching $L_{j-1}$ is not individually provided from the register, which latches the lower digits, but the latching operation is performed by the same register for the carry bit.

STRUCTURAL EXAMPLE 2 OF MODULAR MULTIPLICATION CIRCUIT

Then, an example in which also A is decomposed for each m bits will now be described.

In order to simplify the structure, assumptions are made that na=nb=nn=n·m and the three integers of n·m bits are A, B and N to perform a calculation of A·B mod N=R. A multiplier for performing multiplication a·b=c of two m-bit small digit integers a and b can be realized by a known simple structure. For example, it is apparent that it can be constituted by a ROM.

A, B and N divided into n sections for each m bits can be expressed as follows:

$$A = A_{n-1} \cdot X^{n-1} + A_{n-2} \cdot X^{n-2} + \ldots + A_1 \cdot X + A_0$$

$$B = B_{n-1} \cdot X^{n-1} + B_{n-2} \cdot X^{n-2} + \ldots + B_1 \cdot X + B_0$$

$$N = N_{n-1} \cdot X^{n-1} + N_{n-2} \cdot X^{n-2} + \ldots + N_1 \cdot X + N_0$$

In this state, assumptions are made that $X = 2^m$ and the bit series formed by dividing A, B and N from the upper digit for each m bits are $A_{n-i}$, $B_{n-i}$ and $N_{n-i}$ (i=1, ..., n). In this case, A, B and N can respectively be considered that they are polynomials and R=A·B mod N can be expressed as follows:

$$R = A \cdot B - Q \cdot N \quad (Q = [A \cdot B / N])$$

Therefore, R can be expressed in accordance with the following algorithm:

---

Algorithm C
$R_0 = 0$

-continued

```
FOR j = 1 TO n
    R_j = R_{j-1} · X + A_{n-j} · B − Q_{j-1} · N
        = R_{j-1} · X + A_{n-j} · B + E_{j-1} − L_{j-1} · X^n
NEXT
IF R_n > N THEN R_n = R_n − Q_n · N
where L_{j-1} = [R_{j-1}X/X^n] = [R_{j-1}/X^{n-1}]
      Q_{j-1} = [L_{j-1} · X^n/N],  Q_n = [R_n/N]
      L_{j-1} · X^n = Q_{j-1} · N + E_{j-1}  (E_{j-1} < N)
```

Since the Algorithm A does not make the discrimination $R>N$, the value $L_{j-1}\cdot X^n$ of $R_{j-1}\cdot X$ which is larger than $X^{n-1}$, which is the maximum digit of N, is subjected to mod N. That is, the coefficient of R, which is larger than $X^{n-1}$ in terms of bit, is subjected to mod N, so that the discrimination $R>N$ can be eliminated. Furthermore, $L_{j-1}\cdot X^n$ is subtracted as an alternative to performing $-Q_{j-1}\cdot N$ which is $L_{j-1}\cdot X^n$ mod N, and then its residue $E_{j-1}$ is added. That is, $L_{j-1}$ is converted into $E_{j-1}$, and they it is added. As a result, all of subtractions in mod N are performed by additions. However, although it is necessary to discriminate whether or not $R_n>0$ one time in this state to perform calculation $R_n=R_n-Q_n\cdot N$, it is performed after the aforesaid repeated calculations have been performed, so that the conventional necessity of making the aforesaid discrimination of $R>N$ during the repeated calculations can be eliminated. Therefore, it can be performed by another circuit or the like. As a result, the overall processing speed is not lowered.

Then, in order to eliminate the delay time generated due to the calculation of $R_j$, decompositions of $R_j$ into to $R_{j,n-1}$ and that of B into $B_{n-i}$ are performed in the Algorithm C to express them by the following algorithm D:

```
Algorithm D
FOR j = 1 TO n
    FOR i = 0 TO n
        R_{j,n-1} = D_{j-1,n-i-1} + C_{j-1,n-i-2} + dw_m (A_{n-j} · B_{n-i})
                 + up_m (A_{n-j} · B_{n-i-1}) + E_{j-1,n-i}
        D_{j,n-1} = dw_m (R_{j,n-i})
        C_{j,n-1} = up_m (R_{j,n-i})
    NEXT
NEXT
where R_{j-1,n} · X^n = Q_{j-1} · N + E_{j-1}, Q_{j-1} =       (4)
      [R_{j-1,n} · X^n/N]
      E_{j-1} = E_{j-1,n-1} · X^{n-1} + E_{j-1,n-2} ·         (5)
      X^{n-2} + , . . . , + E_{j-1,1} · X
      + E_{j-1,0}
D_{0,n-i-1} = C_{0,n-i-2} = E_{0,n-i} = B_n = B_{-1} = 0
dw_m (Z): value of 2^m digits or less of Z
up_m (Z): value obtained by dividing a value of
      2^{m+1} or more digit of Z by 2^{m+1}
```

Although the algorithm C and the algorithm D are basically the same, the algorithm D expresses the operation of the circuit in a more approximate manner. Assuming that $n=4$, the modular multiplication circuit as shown in FIG. 2 is constituted in accordance with the algorithm D.

Figure 2:
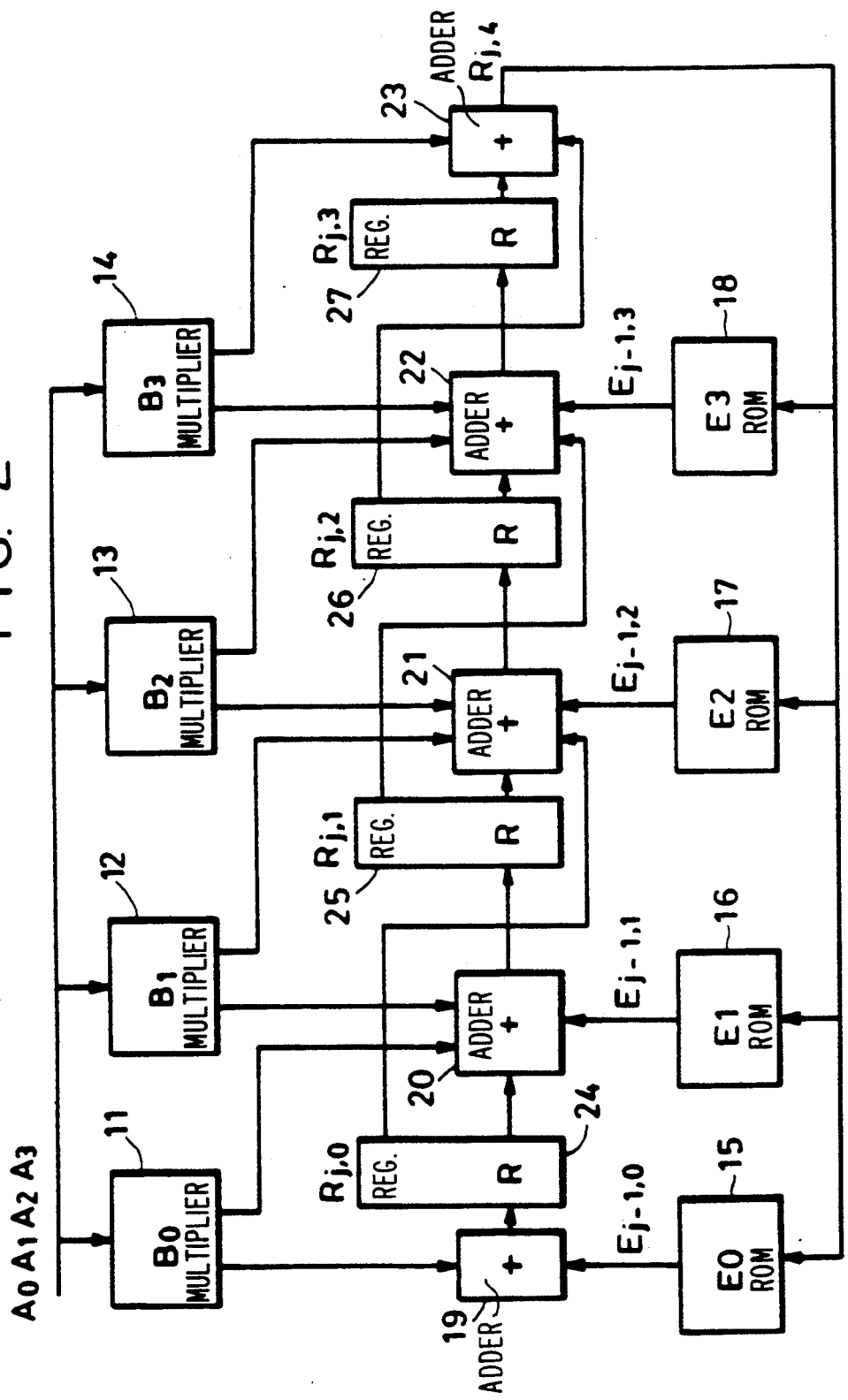

FIG. 2 illustrates a circuit comprising n multipliers of m*m bits for calculating $A_{n-j}\cdot B_{n-i}$, n ROMs for respectively transmitting the value of $E_{j-1,n-i}$ from the value of $R_{j-1,n}$ in accordance with Equations (4) and (5), a 4-input adder of m bits having a 2-bit carry or $n+1$ 5-input adders and n registers of $m+2$ bits for storing $R_{j,n-i}$. The lower m bits of this register means the lower m digits $(dw_m (R_{j,n-i})=D_{j,n-i})$, while the upper 2 bits means a value $(up_m (R_{j,n-i})=C_{j,n-i})$ which is larger than $m+1$ digits of $R_{j,n-i}$.

As a result, the carry of each adder is absorbed by $C_{j,n-i}$ at each clock, and then it is, as the carry, added at the next clock together with the lower m bits of the right register. Therefore, the delay time generated due to the calculation of Rj as is carried out in the algorithm C can be eliminated. As described above, $D_{j,n-i}$, $R_{j,n-i}$ and $C_{j,n-i}$ show the states of the registers and subscript j means a clock, where $n-i$ therefore indicates the position of a circuit changed from $i=0$ to $i=n$ from right to left in FIG. 2. Therefore, $R_{0,0}$ means the register positioned in the left end portion of FIG. 1 in the initial state ($j=0$), while $R_{0,n-1}=R_{0,3}$ means the register positioned in the right end portion, where $R_{0,n}=R_{0,4}$ means the output from the right end adder.

Then, the operation of the circuit shown in FIG. 2 will now be described.

Referring to FIG. 2, the initial state $(R_{0,n-i-1})$ of each register is made to be 0. Since $R_{0,n-i-1}=0$ in this state, $D_{0,n-i-1}=C_{0,n-i-2}=0$.

When $A_3$ is supplied at the first clock ($j=1$), output $A_3\cdot B_{n-i}$ ($i=1, \ldots, 4$) is transmitted from each multiplier. The values of the outputs are divided into the lower m bits and the lower portion by the corresponding adders, and then they are stored in the corresponding registers $(R_{1,n-i}; I=1, \ldots, n)$. At this time, the lower m bits of $R_{1,n-i}$ ($i=1, \ldots, 4$) are made to be $D_{1,n-i}$ before it is stored in the register, while $m+1$ bits or more are, as $C_{1,n-i}$, stored in the same if there is a carry.

When $A_2$ is supplied at the next clock ($j=2$), $A_2\cdot B_{n-i}$ ($i=1, \ldots, 4$) is similarly transmitted from the upper multiplier for each upper and lower m bits. Since $R_{1,4}=up_m (A_3\cdot B_3)$ is transmitted from the right end register via the adder, the value of $E_{1,n-i}$ is transmitted from each ROM to each adder. Although the lower m bits $D_{j-1,n-i-1}$ ($i=2, \ldots, 4$) of the register positioned on the left of the adder is as well as supplied to the adder, the upper 2 bits $C_{j-1,n-i-2}$ of the second register counted in the left direction is, as a carry, supplied to the same adder. Therefore, the adder is formed into a 4-input m-bit adder having a carry of 2 bits or a 5-input adder which transmits an output of $m+2$ bits. Hence, the register is an $m+2$ bit register.

When $A_1$ is supplied at the next clock ($j=3$), $A_1\cdot B_{n-i}$ ($i=1, \ldots, 4$) is transmitted from the upper multiplier at each upper and lower m bits. At this time, $R_{2,4}=up_m (A_2\cdot B_3)+dw_m (A_3\cdot B_3)+E_{1,3}$ is transmitted from the right end register through the adder. Similarly, the value of $E_{2,n-i}$ is transmitted from each ROM to each adder, so that the lower m bit of the register positioned on the left of the adder and the upper 2 bits of the second register positioned on the left of the same counted in the left direction are supplied to the same adder.

When $A_0$ is supplied at the next clock ($j=4$), a similar operation is performed, so that the value stored in each register is $R_n$.

STRUCTURAL EXAMPLE 3 OF MODULAR MULTIPLICATION CIRCUIT

Figure 3:
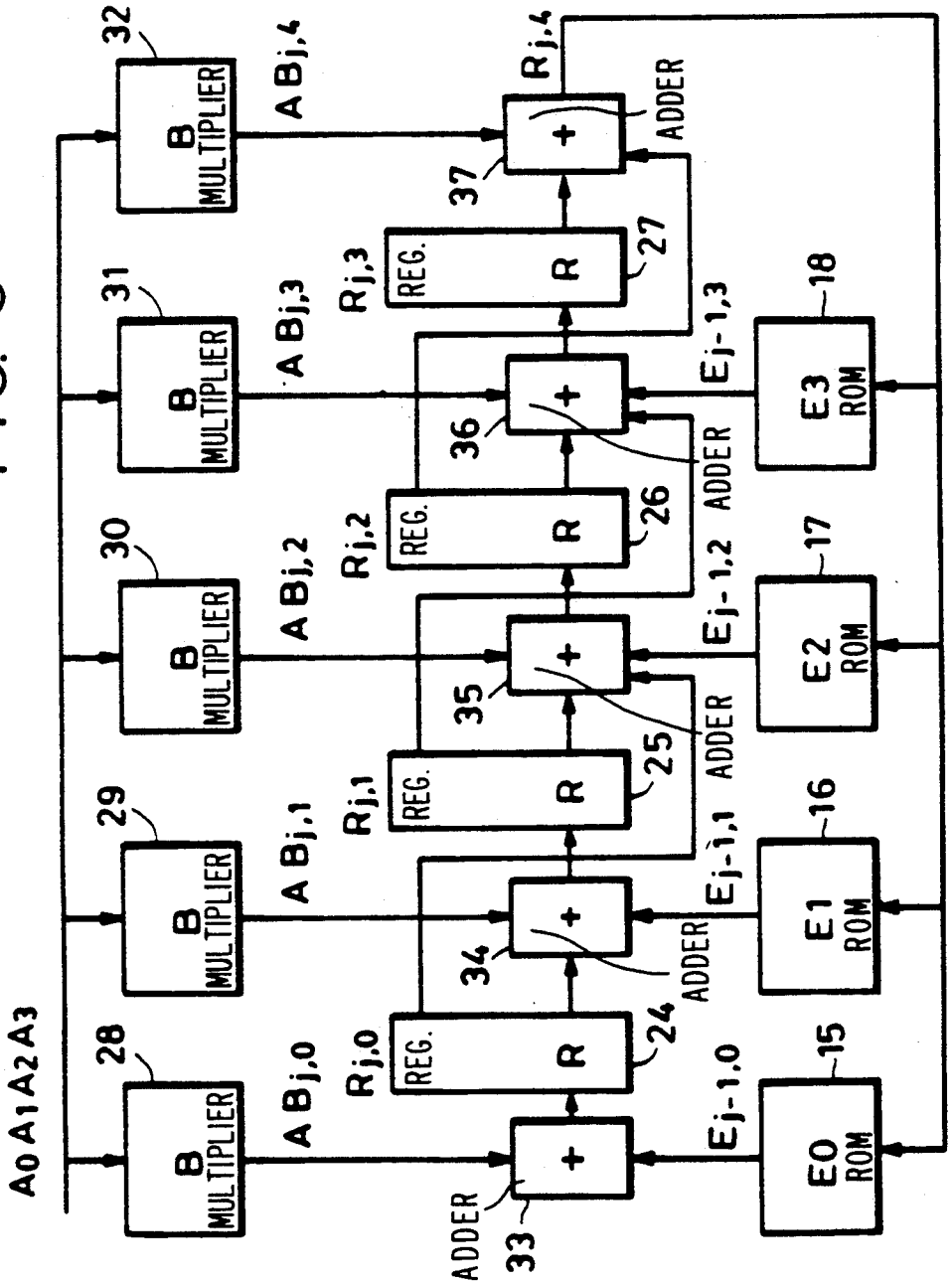

Although the Algorithm D according to Embodiment 1 decomposes the output from the multiplier into two outputs $dw_m (A_{n-j}\cdot B_{n-i})$ and $up_m (A_{n-j}\cdot B_{n-i-1})$, the structure may be arranged in such a manner that $A_{n-j}$ is supplied, the value of $A_{n-j}B$ is divided into some ROMs before it is transmitted as $AB_{j,n-i}$ as shown in FIG. 3 and in accordance with Algorithm E.

```
Algorithm E
  FOR j = 1 TO n
    FOR i = 0 TO n
      R_{j,n-i} = D_{j-1,n-i-1} + C_{j-1,n-i-2} + AB_{j,n-1} + E_{j-1,n-1}
      D_{j,n-i} = Dw_m (R_{j,n-1})
      C_{j,n-i} = up_m (R_{j,n-1})
    NEXT
  NEXT
where A_{n-j} · B = AB_{j-1,n} · X^n + AB_{j-1,n-1} · X^{n-1} + ... + AB_{j-1,0}
```

STRUCTURAL EXAMPLE 4 OF MODULAR MULTIPLICATION CIRCUIT

Then, an example will now be described in which the multiplications of plural bits by means of the ROM or the like are not performed but the residue multiplication is performed only by AND circuits and adders.

```
Algorithm F
  FOR i = 0 TO n
    FOR i = 0 TO n
      R_{j,n-i} = D_{j-1,n-i-1} + C_{j-1,n-i-2} +
                  m-1
                  Σ   a_{j·m-k} · B + E_{j-1,n-i}
                  k=0

D_{j,n-i} = dwm (R_{j,n-i})
      C_{j,n-i} = upm (R_{j,n-i})
    NEXT
  NEXT
```

Figure 4:
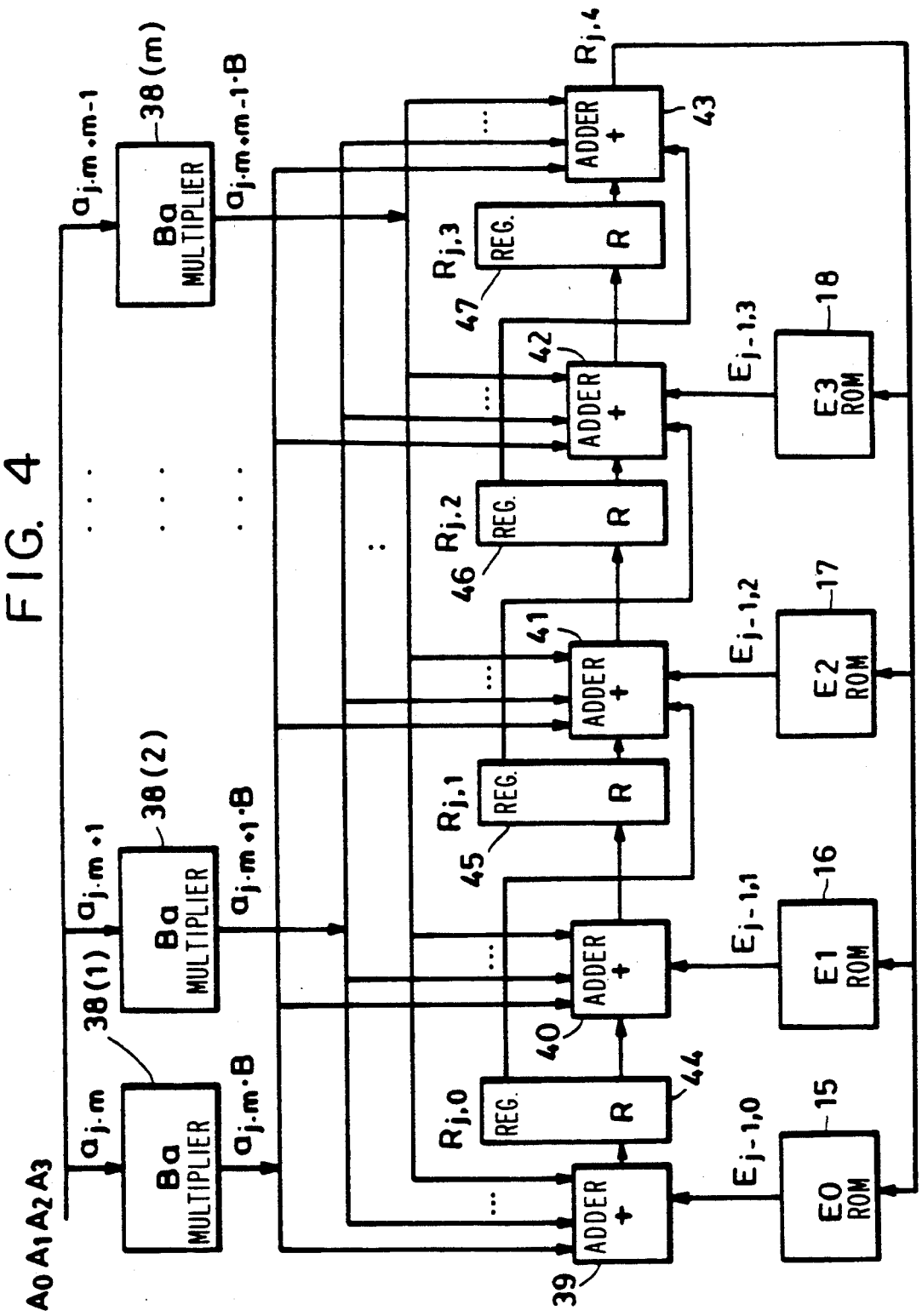

A structural example of the apparatus is shown in FIG. 4. According to this example, $A_{n-j}=(a_{j·m+m-1}, \ldots, a_{j·m+1}, a_{j·m})$ is simultaneously independently supplied for each bit, and then $a_{j·m-k}·B$ (k=0, ..., m−1) is independently transmitted by AND circuits 38 (l) to 38 (m). At this time, $a_{j·m-k}·B$ is 0 when $a_{j·m-k}$ is 0 and is B when the same is 1. The aforesaid output, the lower bit of the left register, the upper bit of register position further on the left and the output from the ROM are added to the m+3 input adder, so that the residue multiplication is realized. Since the size of each of the registers 44 to 47 at this time is the sum of m+3 terms of m bits, it must be $m+\log_2(m+3)$ or larger.

Figure 5:
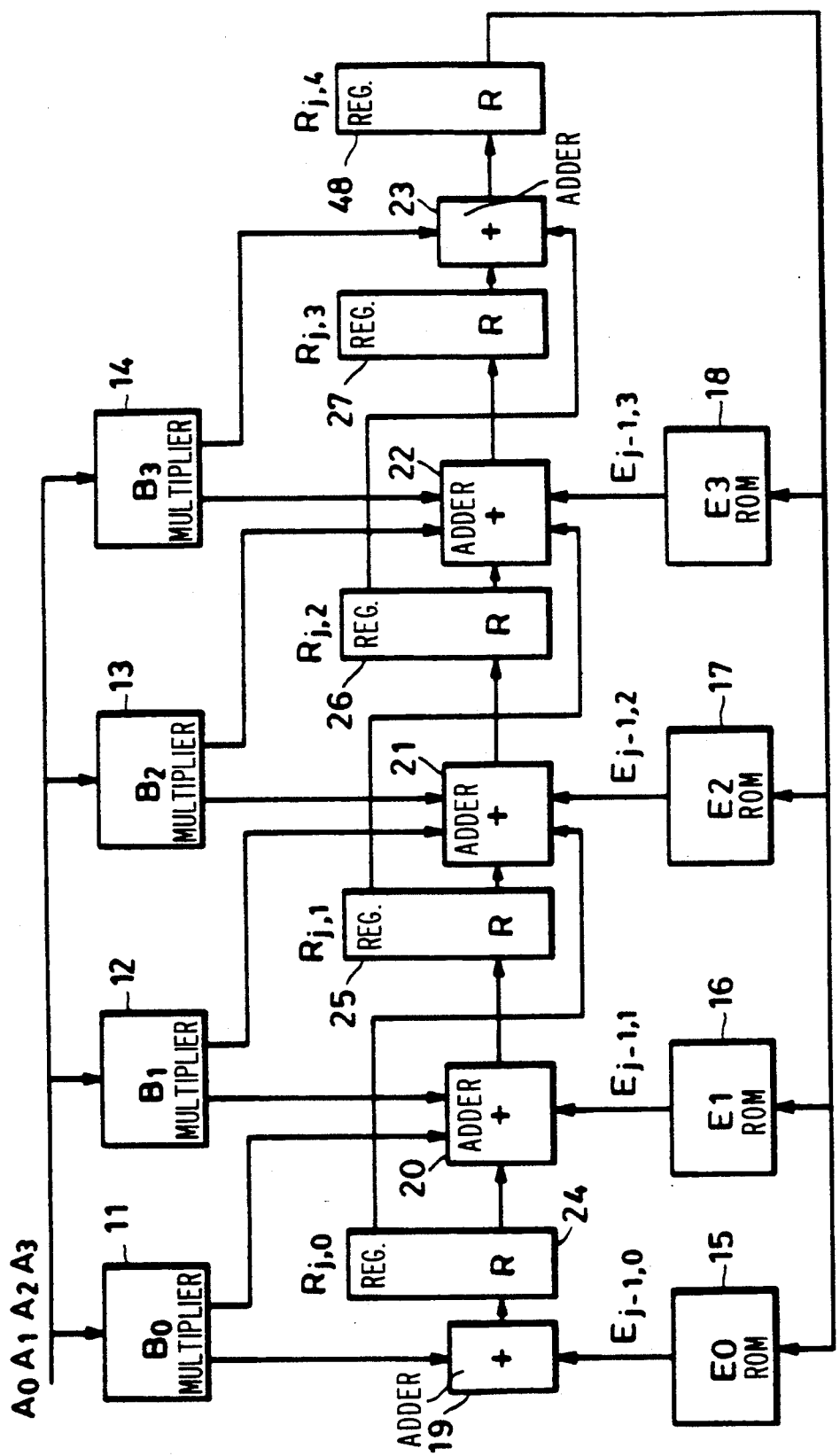
Figure 6:
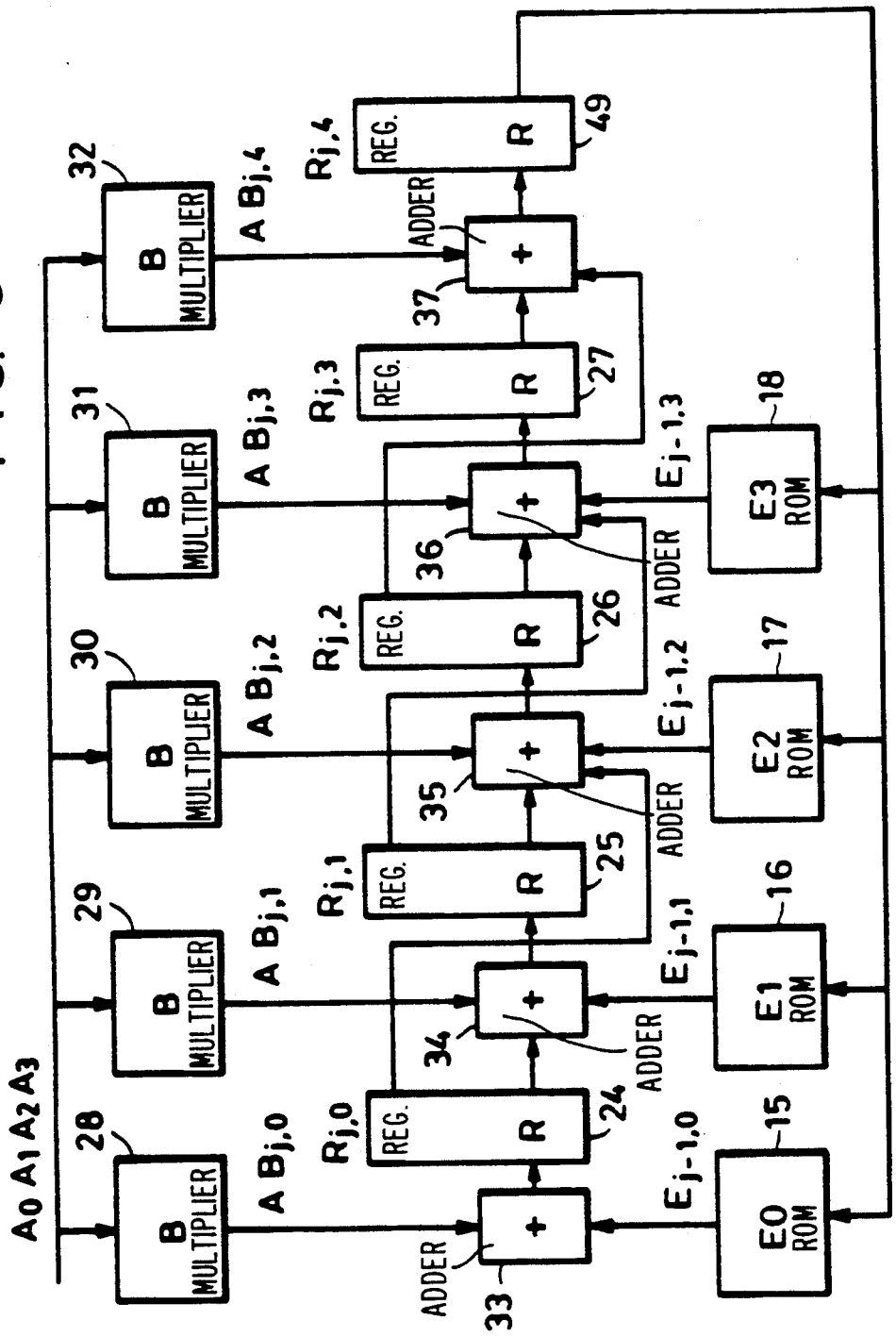
Figure 7:
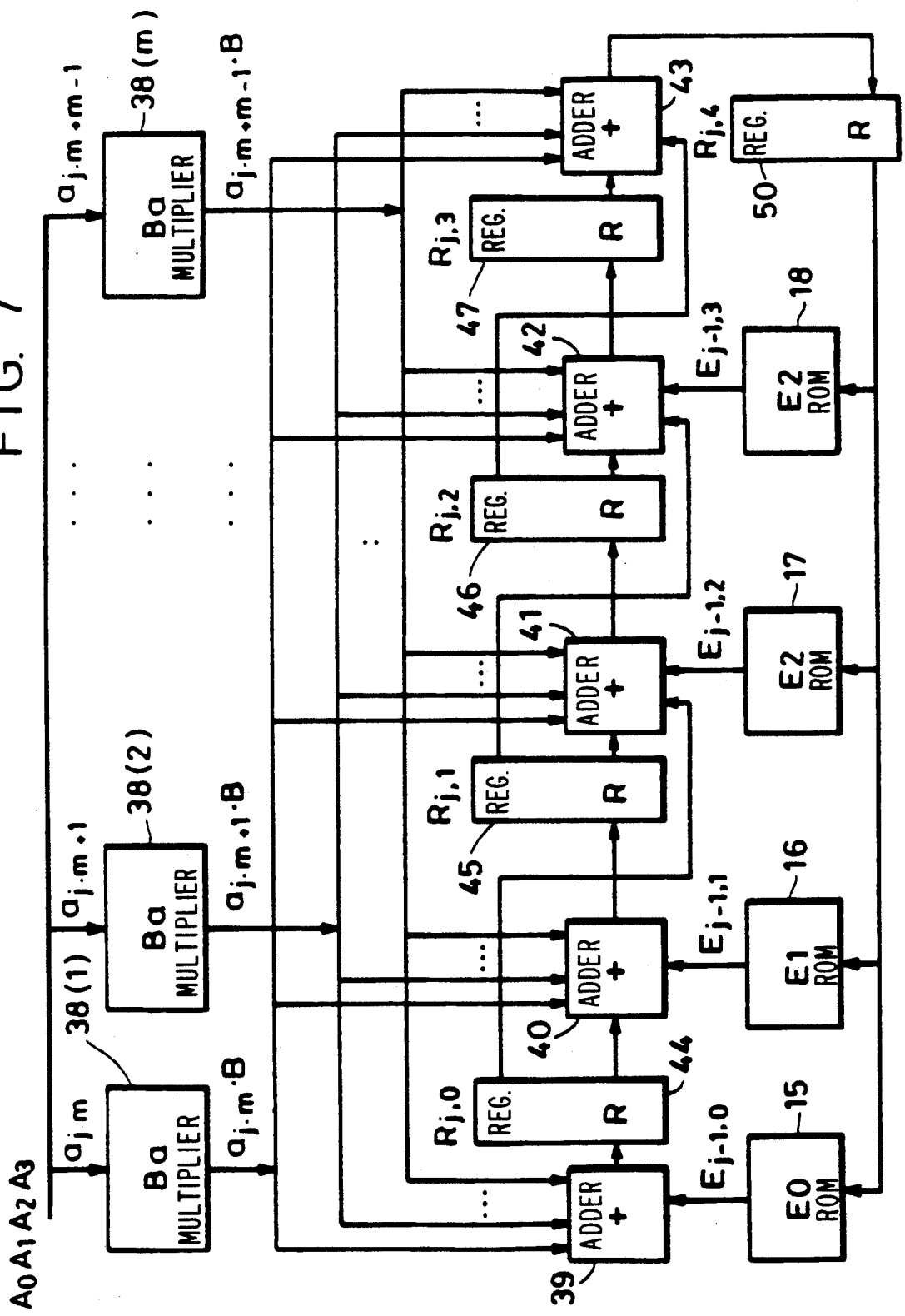

The value of $R_{j,n}$ may be temporarily latched by the register in the structure shown in FIGS. 2 to 4. In this case, the maximum time for one clock required to temporarily latch the value of $R_{j,n}$ may be a timer required to perform the multiplication or the division, so that the calculations in the Algorithms D to F can be repeated in a short time. The adaptable circuit structure is shown in FIGS. 5 to 7.

Furthermore, the following algorithm may be employed in place of the algorithm C:

```
Algorithm G
R_0 = 0
  FOR j = 1 TO n
    R_j = R_{j-1} · X + A_{n-j} · B − Q_{j-1} · N · X
        = R_{j-1} · X + A_{n-j} · B + (E_{j-1} − L_{j-1} · X^n) · X
  NEXT
  IF R_n > N THEN R_n = R_n − Q_n · N
where L_{j-1} = [R_{j-1}/X^n]
      Q_{j-1} = [L_{j-1} · X^{n+1}/N], Q_n = [R_n/N]
      L_{j-1} · X^{n+1} = (Q_{j-1} · N + E_{j-1}) · X (E_{j-1} < N)
```

Figure 8:
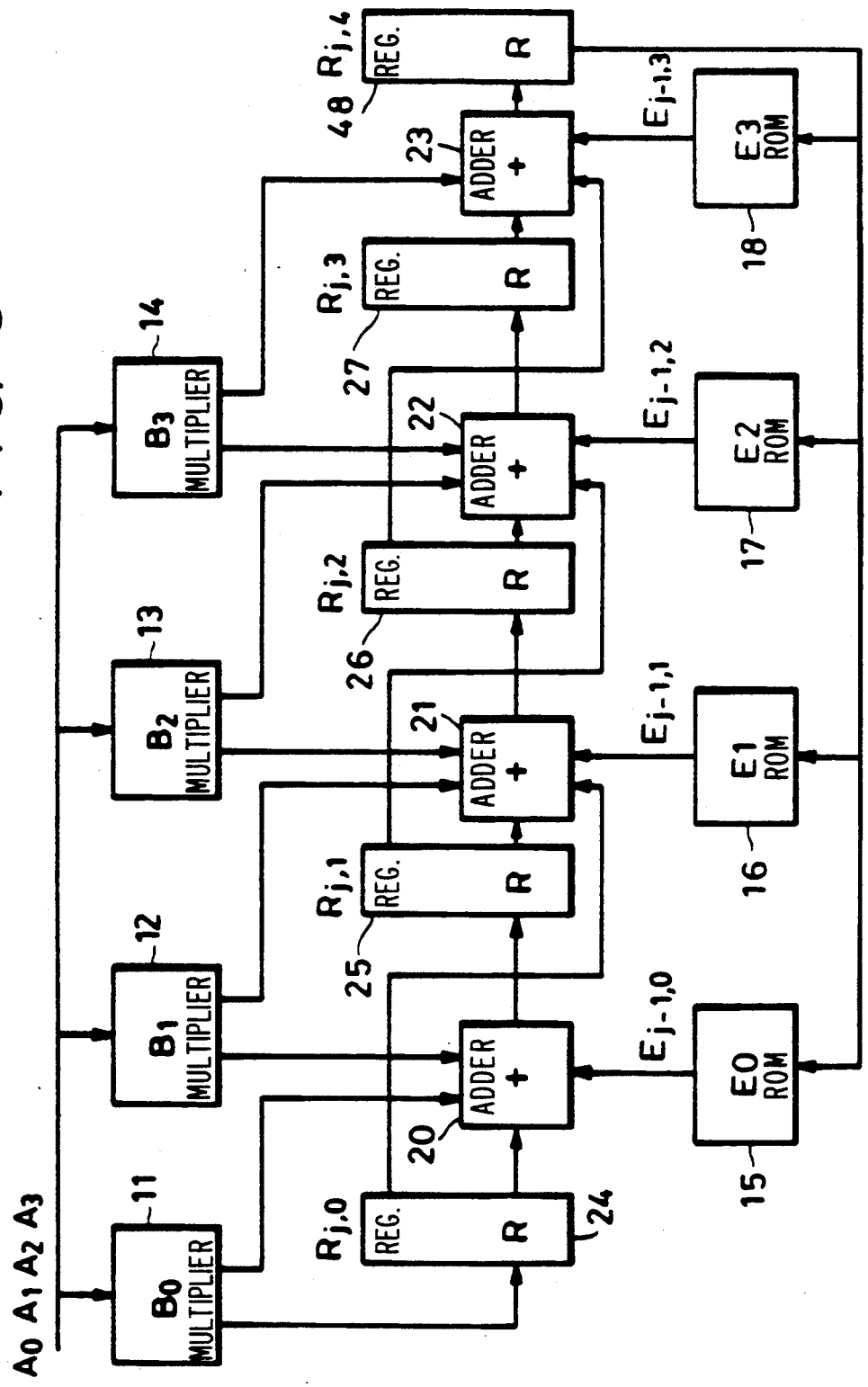
Figure 9:
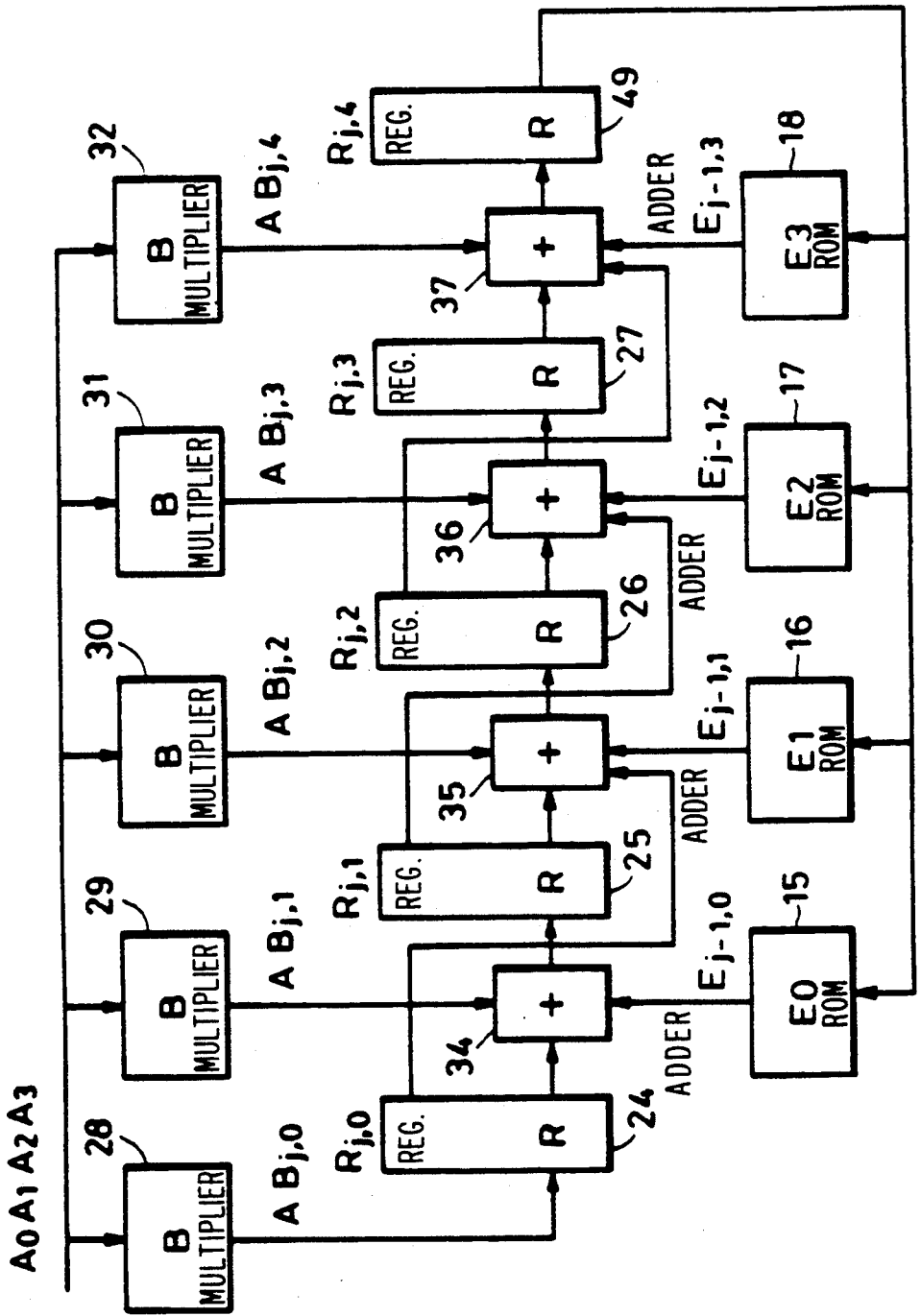
Figure 10:
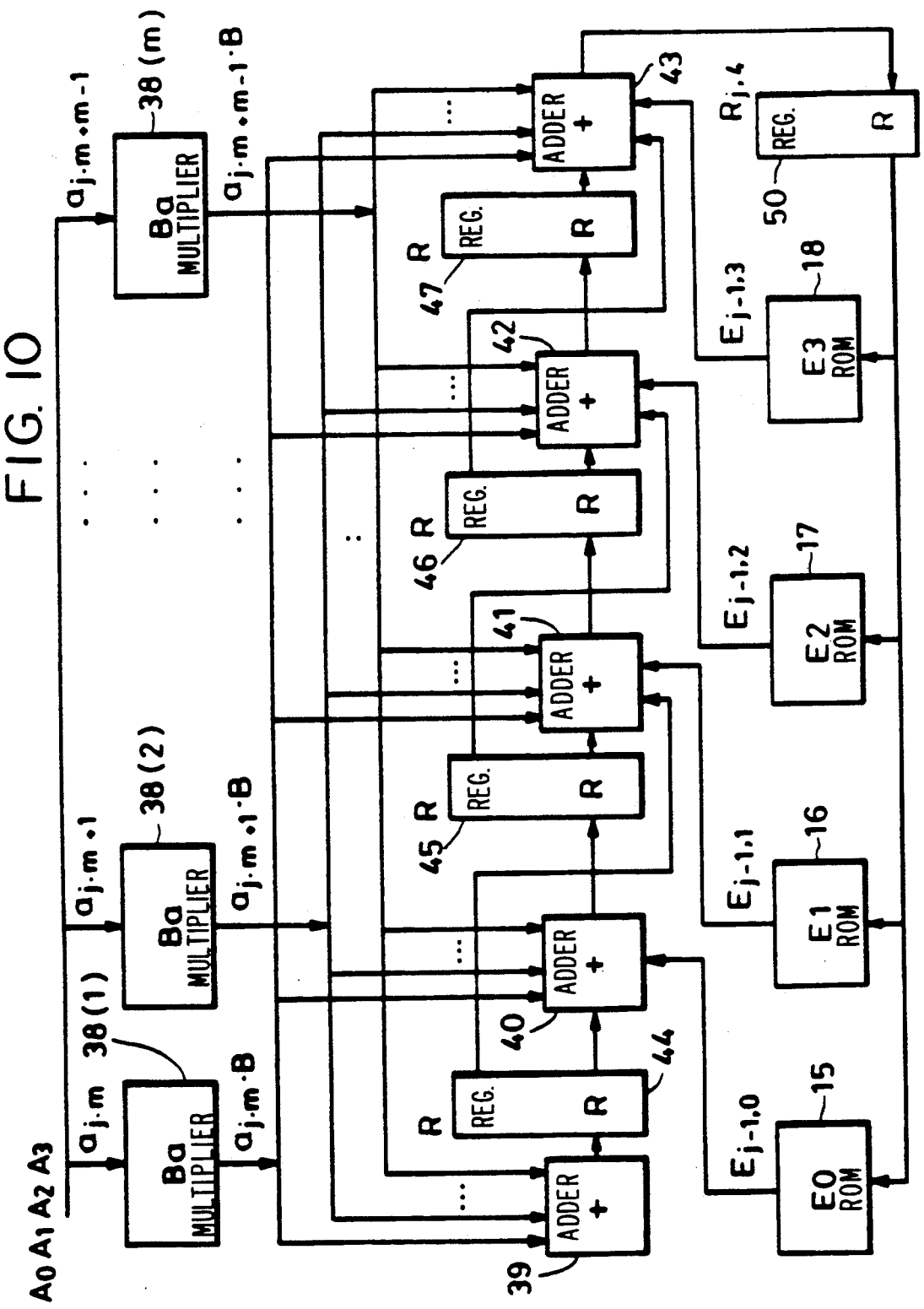

In the aforesaid algorithm, X acts to shift the output of residue $E_{j-1}$ with respect to output $A_{n-j}·B$ from the multiplier. As a result, the adder for calculating the input value to the left end register shown in FIGS. 5 and 6 can be eliminated from the structure. FIGS. 8 to 10 illustrate circuits adaptable to the aforesaid algorithm.

If c registers are added to the right end portion of each of circuits shown in FIGS. 8 to 10, $-Q_{j-1}·N·X^c = (-L_{j-1}·X_{n+1}+E_{j-1})·X^c$ and thereby the residue output $E_{j-1}$ can arbitrary be shifted.

As described above, the n·m bit-modular multiplication circuit can efficiently be realized in a case where the input value is divided into n sections for each m bits so as to be supplied. It is apparent that the modular multiplication circuit can be realized by employing a similar structure of the circuit in a case of na≠n, nb≠n and $n_n \neq n$.

In the aforesaid circuit according to this embodiment, the carry is temporarily held by $C_{j,n-i}$ and thereby the delay time generated due to the carry can be eliminated. Therefore, the calculations to be performed in the algorithms D to F can be repeated in a short time.

Furthermore, value $L_{j-1}·X^n$ of $R_{j-1}$ which is larger than $X^{n-1}$ which is the maximum digit of N is subjected to mod N, the discrimination whether or not R>N can be eliminated. Furthermore, $E_{j-1}$ holding a relationship $-Q_{j-1}·N = -L_{j-1}·X^n + E_{j-1}$ in place of executing $-Q_{j-1}·N$, so that all of the residue calculations can be performed by additions.

Furthermore, by decomposing the multiplication for each small digit (Algorithm D), by forming the structure by the ROM in a case where B is a constant (Algorithm E), or by executing the multiplication by using no multiplier but is performed by using only the AND and the adder (Algorithm F), the multiplication can be performed while eliminating a multiplier for multiplying large digit numbers. Therefore, a modular multiplication circuit operated in accordance with the Algorithm D is suitable in a case where small digit multipliers can easily be used because of a TTL or a self-library, that operated in accordance with Algorithm E is suitable in a case where B can be used as a constant and that operated in accordance with algorithm F is suitable in a case where a multiplier such as the ROM and the self-library is not provided.

Furthermore, the structure constituted by repeating the same operator as shown in FIGS. 1 to 10 will enable an advantage to be obtained in that a large size circuit such as the VLSI can easily be constituted.

As described above, the calculating apparatus according to the present invention will enable an advantage to be obtained in that high speed residue calculation can be performed while reducing the size of the circuit.

Furthermore, since the calculating apparatus according to the present invention is constituted by repeating the same operators, a circuit by using a VLSI or the like can easily be formed.

Another effect can be obtained from the present invention in that an encryption/decryption apparatus for use in communications by using encryptograph can be realized while reducing the size of the circuit.

STRUCTURAL EXAMPLE OF ENCRYPTION/DECRYPTION APPARATUS

Then, a method of the encription communication by using the aforesaid calculating apparatus will now be described. Assuming that a plain text to be communicated is M, a cryptogram is C, a public cryptogram key is e, a decryption key is d, and a public modulo is N, the encryption and the decryption of the RSA cryptograph are expressed by the following modular exponentiations:

Encryption: $C = M^e \mod N$

Decryption: $M = C^d \mod N$

The modular exponentation: $C = M^e \mod N$ is calculated in accordance with the aforesaid Algorithm (O).

Figure 11:
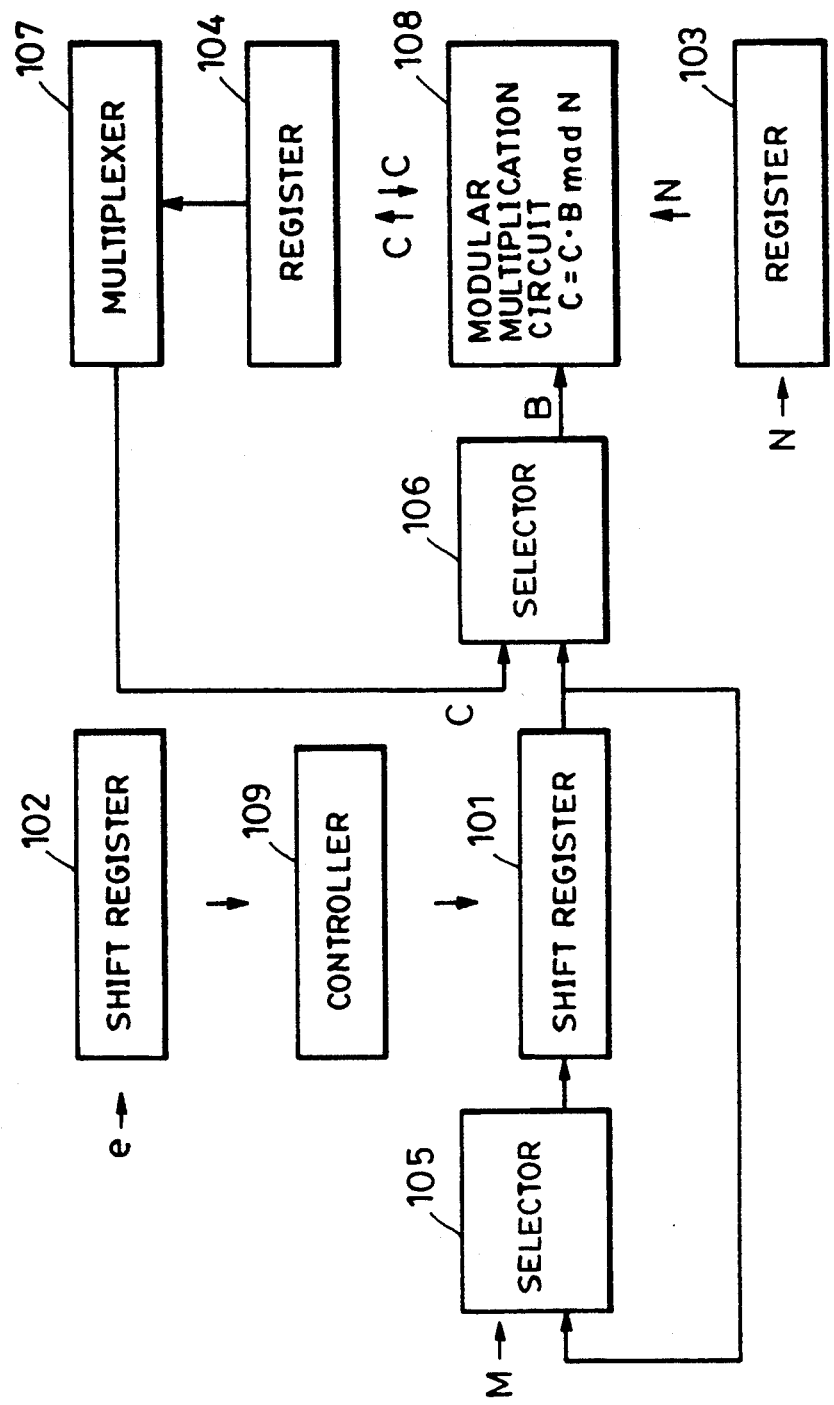
FIG. 11 illustrates a structural example of a encryption/decryption apparatus.

Therefore, the modular exponentation can be realized by repeating the modular multiplication $C = C \cdot B \mod N$ (B is M or C). The modular exponentation can be realized by circuits formed as shown in FIGS. 1 to 10. A circuit capable of efficiently executing the algorithm is shown in FIG. 11. Referring to FIG. 11, reference numerals 101 and 102 represent shift registers for respectively storing the values of M and e. Reference numerals 103 and 104 represent registers for respectively storing the values of N and C. Reference numerals 105 and 106 represent select switches for selecting the inputs and 107 represents a multiplexer for selecting the value of C in the register 104 for each m bits (m is an arbitrary integer) from the upper digits to transmit it in serial. Reference numeral 108 represents a modular multiplication circuit for executing the calculation $C = C \cdot B \mod N$ and arranged as shown in FIGS. 1 to 10. Reference numeral 109 represents a controller for discriminating whether or not $e_i = 1$ or $i > 1$ to control calculations 1 and 2 of the Algorithm (O) or controlling a clear signal or a preset signal for the selector and the register at the time of the receipt of the signal or the initialization. The controller 109 can easily be formed by a counter, a ROM and some logical circuits.

Then, the operation of the circuit shown in FIG. 11 will now be described.

The circuit receives plain text M, public key e and public modulo N. Therefore, M, e and N are in serial or parallel supplied to the register 103. At this time, the selector 105 selects M to supply M to the register 101. Simultaneously, initialization is performed in such a manner that $C = 1$ by the clear signal or the preset signal for the register as an alternative to supplying the value of C to the register 104.

After the input and the initialization has been completed, the modular multiplications in accordance with the calculations 1 and 2 are commenced. The difference between the calculation 1 and the calculation 2 lies in a fact that B is M or C in the modular multiplication $C = C \cdot B \mod N$. Therefore, in a case where the calculation 1 is executed, the selector 106 selects serial output M for each m bits from the register 101. In a case where the calculation 2 is executed, the selector 106 selects serial output C for each m bits from the multiplexer 107. The serial output M for each m bits from the shift register 101 is again supplied to the shift register 101 via the selector 105. The modular multiplication circuit 108 are constituted and operated as described above. The output C from the modular multiplication circuit 108 is, in parallel, supplied to the register 104 so as to be used in the next residue multiplication, so that the calculations 1 and 2 are efficiently repeated.

If the apparatus is arranged to receive C and d in place of M and e, a cryptogram can be decripted.

As described above, the calculating apparatus according to the present invention will enable an effect to be obtained in that the residue calculation can be executed at high speed with a small size of the circuit.

Furthermore, since the calculating apparatus according to the present invention is formed by repeating the same operators, a circuit by using a VLSI or the like can be easily constituted.

In addition, another effect can be obtained from the present invention, an encryption/decryption apparatus for performing an encriptograph communication can be realized by a small size circuit.

PARALLELIZING THE CALCULATING CIRCUIT WITH PROCESSING ELEMENT

Algorithm H
FOR j = 1 TO n
  FOR i = 1 TO n
    $R_{j,n-i} = D_{j-1,n-i} + C_{j-2,n-i} + dw_m (A_{n-j} \cdot B_{n-i})$
    $+ up_m (A_{n-j-1} \cdot B_{n-i}) + E_{j-1,n-i}$
    $D_{j,n-i} = dw_m (R_{j,n-i})$
    $S_{j,n-i} = up_m (R_{j,n-i})$
    $C_{j,n-i} = S_{j,n-i}$
  NEXT
NEXT
where $R_{j-1,n} \cdot X^n = Q_{j-1} \cdot N + E_{j-1}, Q_{j-1} =$   (6)
  $[R_{j-1,n} \cdot X^n / N]$
$E_{j-1} = E_{j-1,n-1} \cdot X^{n-1} + E_{j-1,n-2} \cdot$   (7)
$X^{n-2} + \ldots + E_{j-1}, 1 \cdot X$
$+ E_{j-1}, 0$ (7)
$D_{0,n-i-1} = C_{0,n-i-2} = E_{0,n-i} = B_n = B_{-1} = 0$
$dW_m (Z)$: value smaller than $2^m$ digit of Z
$up_m (Z)$: value obtained by dividing a value larger
    than $2^{m+1}$ of Z by $2^{m+1}$ Although Algorithm H and Algorithm C are basically the same, Algorithm H is more suitable to parallelize the circuit. Algorithm H is able to form the multiplier by a circuit shown in FIGS. 12 and 13.

Figure 12:
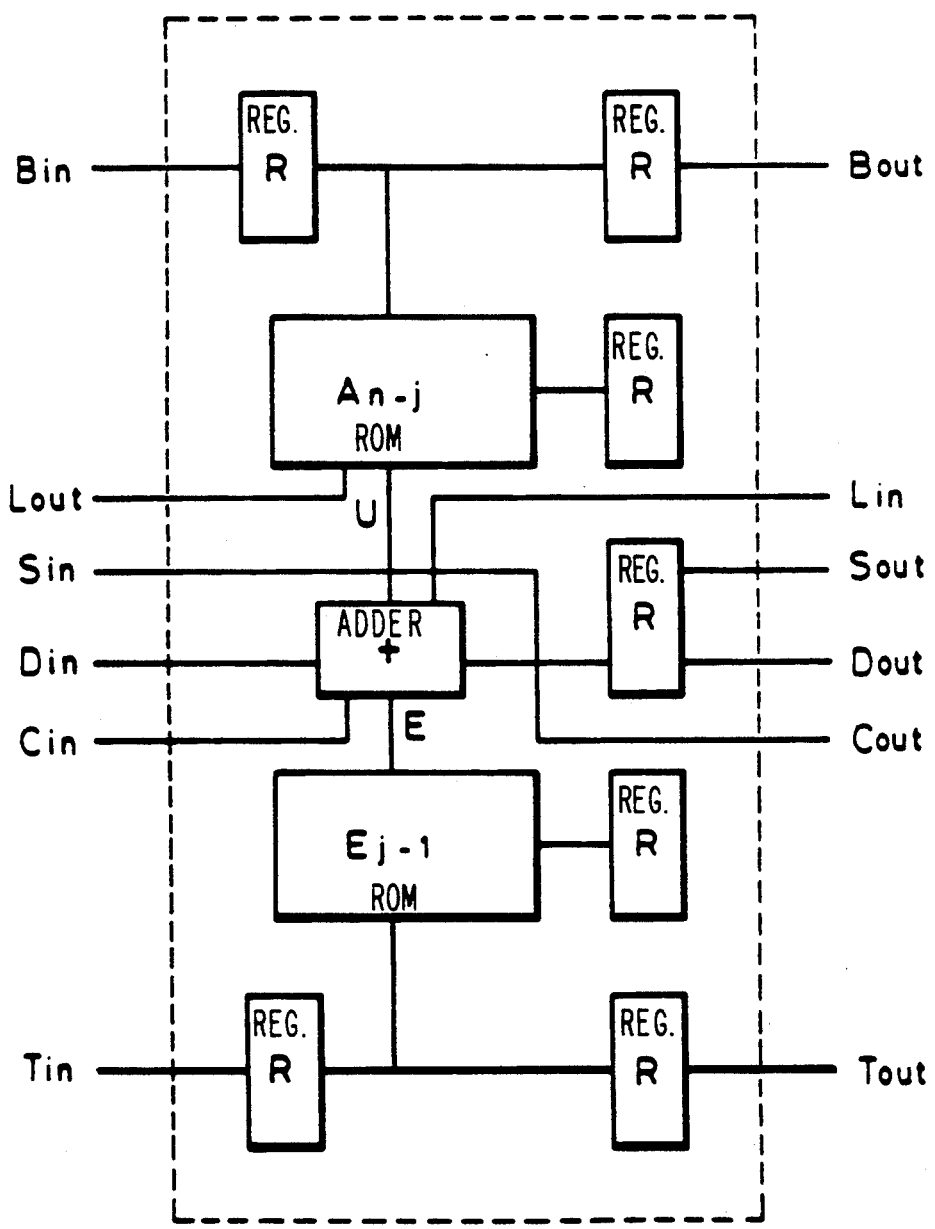
FIGS. 12, 21 and 28 illustrate structural examples of processing elements (PE) for performing the modular multiplication.

FIG. 12 illustrates a circuit for executing basic calculation $R = R \cdot X + A_{n-j} \cdot B \mod N$ of the residue multiplication and called a basic operator (processing element which is abbreviated to "PE" hereinafter).

Specifically, it performs calculation $R_{j,n-i} = D_{j-1,n-i} + C_{j-2,n-i} + dW_m (A_{n-j} \cdot B_{n-i}) + up_m (A_{n-j-1} \cdot B_{n-i}) + E_{j-1,n-i}$ as shown in Algorithm H.

Figure 13:
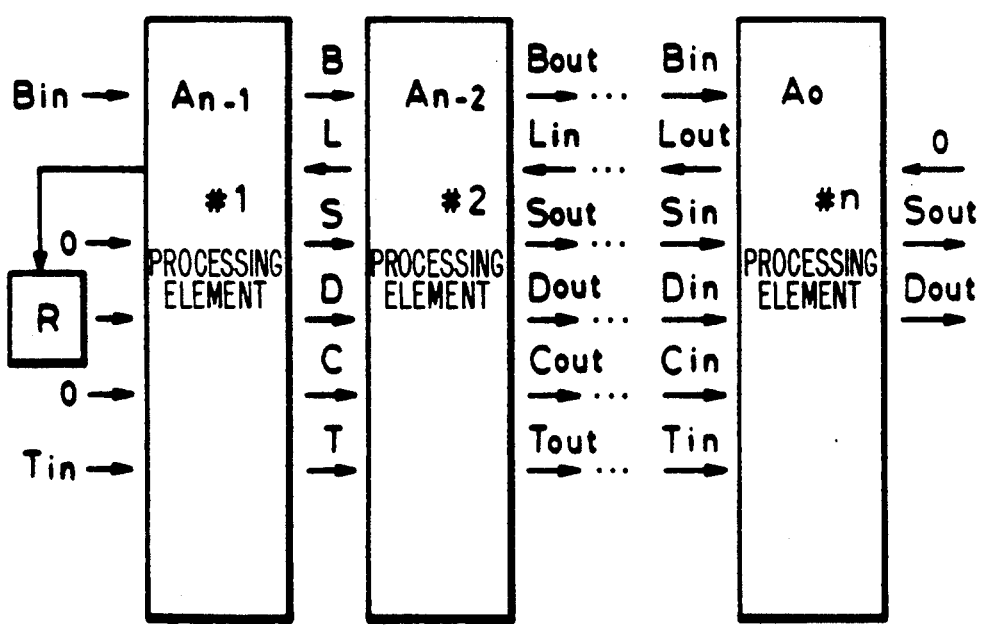
FIGS. 13 to 19, 22, 23 and 27 illustrate structural examples of a circuit for use in a calculating apparatus having PEs.

FIG. 13 illustrates a structure the overall body of which is formed into a so-called systolic array. The systolic array performs the calculation by a pipe line process by PEs which are small and same functional blocks. The PE is formed as shown in FIG. 12.

The PE shown in FIG. 12 comprises a m*m-bit multiplier for calculating $A_{n-j} \cdot B_{n-i}$, ROMs for respectively transmitting the value of $E_{j-1,n-1}$ from the value of $R_{j-1,n}$ in accordance with Equations (6) and (7), n+1 pieces of 4-input m-bit adders each having a 2-bit carry or 5-input adders, a m+2 bit register for storing $R_{j,n-i}$ (i=1, ..., n) registers for respectively storing $A_{n-i}$, $Q_{j-1}$ and a two-stage register for delaying $B_{n-i}$, $T_{n-i}$.

The lower m bits of this register means the lower m digits ($dW_m (R_{j,n-i}) = D_{j,n-i}$) of $R_{j,n-i}$, while the upper 2 bits means a value ($up_m (R_{j,n-i}) = S_{j,n-i}$) larger than $m+1$ digit of $R_{j,n-i}$. As a result, the carry for each adder can be absorbed at each clock by $S_{n,n-i}$. Furthermore, $S_{j,n-i}$ is made to be $C_{j,n-i}$ at the right PE before it is, as a carry, added together with the lower m bits of the right register in the second PE counted in the right direction. Therefore, the delay time generated due to the calculation of $R_j$ performed in accordance with Algorithm C can be eliminated.

As described above, $D_{j,n-i}$, $R_{j,n-i}$ and $C_{j,n-i}$ respectively show the state of the register, where subscript i means the clock and j represent the sequential order in FIG. 13. Therefore, the position of the PE from j=1 (#1) to j=n (#n) from right to left is indicated.

Then, the operations of the structures shown in FIGS. 12 and 13 will now be described. Then, a description will be made about a timing chart of circuits shown in FIGS. 12 and 13 in a case where n=4.

```
#1: L out    |AB6|AB5|AB4|AB3|  0  |  0  |AB6|AB5|AB4|AB3|
    B in     | B3| B2| B1| B0|  0  | B3 | B2| B1| B0|  0 |
    U (A3)   |AB7|AB6|AB5|AB4|  0  |  0  |AB6|AB5|AB4|  0 |
    P        |  0                  |  0                   |
    E j-1    |  0                  |  0                   |
    D out    |    | D7| D6| D5| D4| D3|    | D7| D6| D5| D4| D3|
    S out    |  0 |    | S7| S6| S5|  0  |  0  |    | S7| S6| S5| S4|

#2: L out    |AB5|AB4|AB3|AB2|  0  |  0  |AB5|AB4|AB3|AB2|
    B in     | B3| B2| B1| B0|  0  | B3 | B2| B1| B0|  0 |
    U (A3)   |AB6|AB5|AB4|AB3|  0  |AB6|AB5|AB4|AB3|  0 |
    P        |D7+S7                |D7+S7                 |
    E j-1    |   | E6| E5| E4| E3| 0 | E5| E4| E3| E2| 0 |
    D out    |   | D6| D5| D4| D3| D2| D6| D5| D4| D3|
    C out    | 0 | 0 | C6| C5| 0 | 0 | 0 | C6| C5| C4|
    S out    | 0 |   | S7| S6| S5| S4| 0 |   | S7| S6| S5| S4|

#3: L out    |   | 0 |AB4|AB3|AB2|AB1| 0 |AB4|AB3|
    B in     |   | B3| B2| B1| B0| 0 | B3| B2| B1|
    U (A3)   |   |AB5|AB4|AB3|AB2| 0 |AB5|AB4|AB3|
    P        |S7;D6+S6            |S7;D6+C6           |
    E j-1    |   | E5| E4| E3| E2| 0 | E4| E3| E2|
    D out    |   |   | D5| D4| D3| D2| D1| D5| D4|
    C out    | 0 | 0 | C5| C4| 0 | 0 | 0 | C5| C4|
    S out    |   |   | S6| S5| S4| S3| 0 | S6| S5|

#4: L out    |   | 0 |AB4|AB3|AB2|AB1| 0 |
    B in     |   | B3| B2| B1| B0| 0 | B3|
    U (A3)   |   |AB5|AB4|AB3|AB2| 0 |AB4|
    P        |S6;D5+S5            |S6;D              |
    E j-1    |   | E4| E3| E2| E1| 0 | E3|
    D out    |   |   | D4| D3| D2| D1| D0|
    C out    | 0 | 0 | C4| C3| 0 | 0 | 0 |
    S out    |   |   | S5| S4| S3| S2| 0 |
```

The initial state of each register shown in FIGS. 12 and 13 is 0.

When B is supplied from Bin at the first PE (j=1) for each m bits in an order B3, . . . , B0, the multiplier, which receives their values, sequentially transmits $A_3 \cdot B_{n-i}$ (i=1, . . . , 4). For example, $A_3 \cdot B_3$ is the coefficient of $X^6$ in terms of the multiplication of a polynomial and as well as it includes the coefficient of $X^7$ since the aforesaid output is 2m bits. Therefore, the output from the multiplier divided into upper and lower m digits is expressed by ABi (i=7, . . . , 4) in the aforesaid chart because outputs U of the upper m bits are the coefficients of $X^7$ to $X^4$. Since outputs Lout of the lower m bits are the coefficients of $X^6$ to $X^3$, it is expressed by ABi (i=6, . . . , 3). The upper m-bit outputs U are supplied to the adders of the same PE, while the lower m-bit outputs Lout are temporarily delayed by one clock by an external register to be D0,n−i, and then it is added by the adder of the No. 1 PE. Furthermore, this adder adds feedback output Lout supplied from a No. 2 PE to be described later to supply the result of this to a register ($R_{1,n-i}$). At this time, the lower m bits of $R_{1,n-i}$(i=1, . . , 4) is, as $D_{1,n-i}$, transmitted to the next PE. On the other hand, m+1 bits or more, which are the carries, are transmitted as $S_{1,n-i}$ to pass through the next PE before it is transmitted to the second PE counted in the forward direction as $C_{1,n-i}$. Since $D_{1,n-i}$ and $C_{1,n-i}$ are the coefficients of $X^7$ to $X^4$ and $X^7$ to $X^5$ in terms of the coefficient of the polynomial, they are expressed by Dk (k=7, . . . , 4) and Ck (k=7, . . . , 5). In the aforesaid chart, other signals are as well as expressed by using the coefficient of the polynomial. Furthermore, $E_{0,n-i}$ expressing the residue is 0 and each $T_{n-i}$ (i=1, . . . , 4) which is the timing of the residue is delayed by 2 clocks by the register before it is transmitted to the next PE.

When B is similarly supplied to the next PE (j=2) at j=1, $A_2 \cdot B_{n-i}$ (i=1, . . . , 4) is transmitted from the multiplier for each upper and lower m bits. At this time, the lower m bits are, as Lout, fed back to the No. 1 PE.

When the result of an addition of D7 and S7 supplied from the No. 1 PE is, as $R_{1,n}$, stored in a register P. Then, the value of $E_{j-1}$ obtained from Equation (1) is synchronized with $T_{n-i}$ so as to be sequentially transmitted from the ROM as $E_{1,n-i}$ to the adder. The result of this is, as $R_{2,n-i}$, supplied to the register so as to be transmitted to the next PE as Dk and Sk.

When B is supplied at the next PE (j=3), $A_1 \cdot B_{n-i}$ (i=1, . . . , 4) is transmitted from the multiplier for each upper and lower m bits before U, Lout, Din and $E_{j-1}$ are added similarly to the former PE. Furthermore, $C_{1,n-i}$, which is the carry from the second former PE, is added, so that the calculations in the Algorithm H are performed. Since U, Lout, Din and $E_{j-1}$ respectively are m bits, the output from the adder is m+2 bits. Therefore, the register of $R_{j,n-i}$ must have m+2 bits. If the carry bit is 2 bits, the output from the adder is m+2 and is therefore not changed if it is added to the adder as a carry.

At the next PE (j=4), an operation similar to that when j=3 is performed. As a result, the value stored in each register is $R_n$.

EMBODIMENT 2 OF MODULAR MULTIPLYING CIRCUIT HAVING PE

Figure 14:
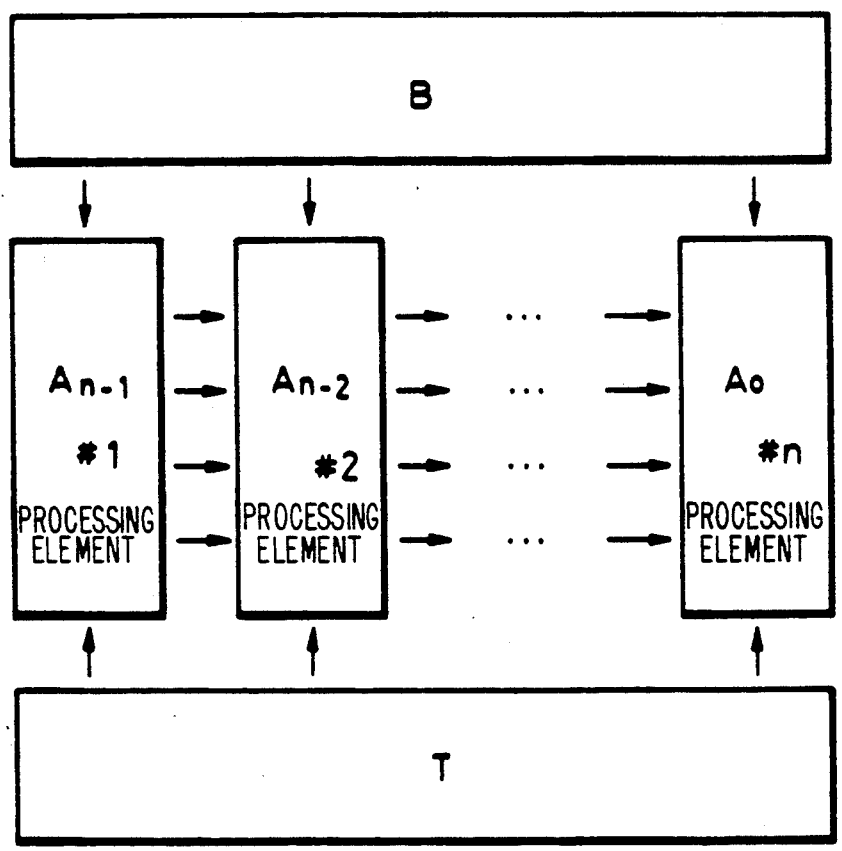
Figure 15:
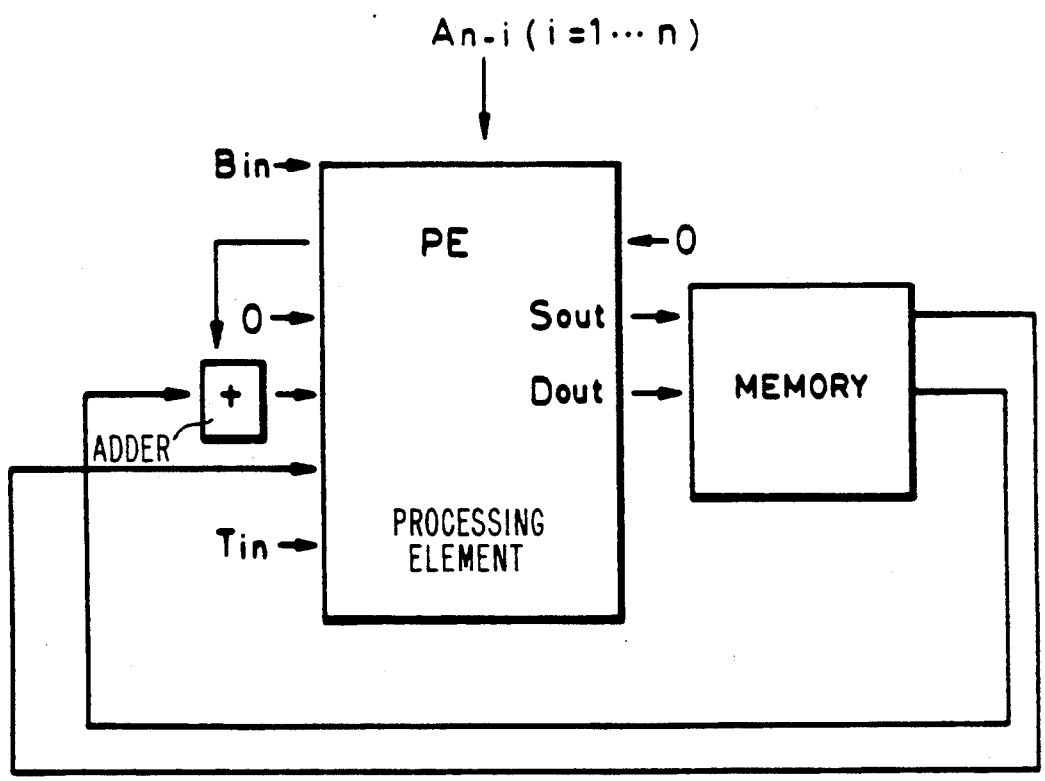

The four registers which receive Bin and Tin in the PE shown in FIG. 12 act only to delay the inputs Bin and Tin by 2 clocks. Therefore, the overall size of the circuit can be reduced by arranging the structure in such a manner that four output registers which concern B and T are omitted from the PE shown in FIG. 12 and the values of B and T are stored in different shift registers as shown in FIG. 14 to sequentially supply them to each PE at every three registers.

EMBODIMENT 3 OF MODULAR MULTIPLYING CIRCUIT HAVING PE

Since the calculations to be performed in all of the PEs are the same, a structure may be employed in which $A_{n-1}$ is set to PE, B is supplied to perform the calculation, the output from the PE is temporarily stored in a memory, $A_{n-2}$ is reset to the same PE immediately after the operation of the PE has been completed to feed back the outputs from the B and the memory to perform the calculations and the calculations about the $A_{n-i}$ (i=3, ..., n) are repeated, so that the residue multiplication can be performed by one PE. Since the number of the feedback operations can be decreased to 1/p, the processing speed can be multiplied by p times. Therefore, in the aforesaid method, the size of the circuit and the processing speed can arbitrarily and easily traded off depending upon the number of the PEs.

Then, a method in which the feedback is used will now be described.

First, $R_j$ and B are respectively decomposed to $R_{j,n-i}$ and $B_{n-i}$ similarly to Algorithm H to express it as in Algorithm I:

---

Algorithm I
FOR h = 1 TO n/p
  FOR k = 1 TO p
    FOR i = 1 TO n
      j = p · (h − 1) + k
      $R_{j,n-i} = D_{j-1,n-i} + C_{j-2,n-i} + dw_m (A_{n-j} \cdot B_{n-i})$
        $+ up_m (A_{n-j-1} \cdot B_{n-i}) + E_{j-1,n-i}$
      $D_{j,n-i} = dW_m (R_{j,n-i})$
      $S_{j,n-i} = up_m (R_{j,n-i})$
      $C_{j-1,n-i} = S_{j-1,n-i}$
    NEXT
  NEXT
where $R_{j-1,n} \cdot X^n = Q_{j-1} \cdot N + E_{j-1}$, $Q_{j-1} =$     (8)
    $[R_{j-1,n} \cdot X^n/N]$
    $E_{j-1} = E_{j-1,n-1} \cdot X^{n-1} + E_{j-1,n-2} \cdot X_{n-2} + \ldots +$     (9)
    $E_{j-1,1} \cdot X$
      $+ E_{j-1,0}$
$D_{0,n-i-1} = C_{0,n-i-2} = E_{0,n-i} = B_n = B_{-1} = 0$
$dW_m$ (Z): value smaller than $2^m$ digits of Z
$up_m$ (Z): value obtained by dividing a value larger than $2^{m+1}$ of Z by $2^{m+1}$

---

Figure 16:
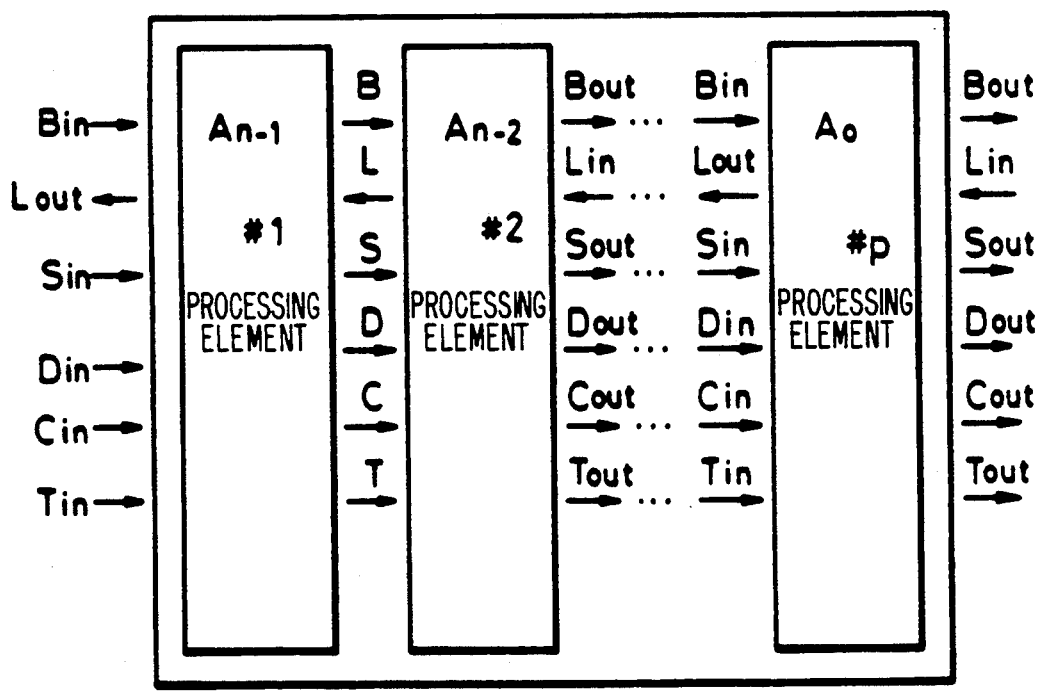

With the Algorithm I, the modular multiplication circuit can be realized by the circuit formed as shown in FIGS. 12 and 16.

Figure 17:
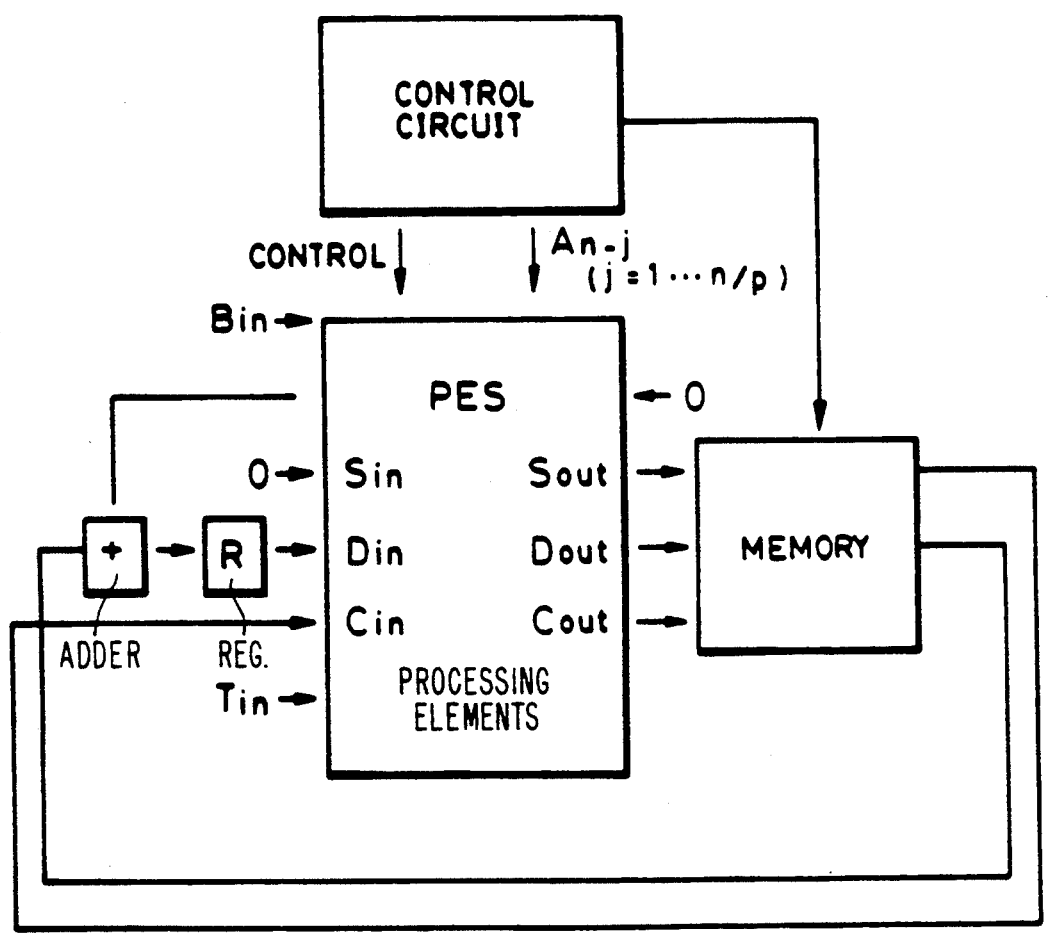

The PE shown in FIG. 12 comprises a m*m bit multiplier for calculating $A_{n-j} \cdot B_{n-i}$, ROMs for respectively transmitting the value of $E_{j-1,n-i}$ from the value of $R_{j-1,n}$ in accordance with Equations (8) and (9), a 4-input adder of m bits having a 2-bit carry or n+1 5-input adders, registers of m+2 bits for storing $R_{j,n-i}$ (i=1, ..., n), registers for respectively storing $A_{n-i}$, $Q_{j-1}$ and two-stage registers for delaying $B_{n-i}$, $T_{n-i}$. The lower m bits of this register means the lower m digits $(dw_m (R_{j,n-i}) = D_{j,n-i})$, while the upper 2 bits means a value $(up_m (R_{j,n-i}) = S_{j,n-i})$ which is larger than m+1 digits of $R_{j,n-i}$. As a result, the carry of each adder is absorbed by $S_{j,n-i}$ at each clock. Furthermore, $S_{j,n-i}$ is made to be $C_{j,n-i}$ at the right PE, and then is, as a carry, added together with the lower m bits of the right register at the right PE. Therefore, the delay time generated due to the calculation of $R_j$ as is carried out in the algorithm H can be eliminated. As described above, $D_{j,n-i}$, $R_{j,n-i}$ and $C_{j,n-i}$ show the states of the registers and subscript j means a clock. Furthermore, k in the Algorithm I denotes the number of the PEs included in one calculating apparatus. FIG. 16 illustrates a calculating apparatus formed by p PEs. Symbol h denotes the number of inputs or feedback inputs to the calculating apparatus shown in FIG. 16. FIG. 17 illustrates the calculating apparatus shown in FIG. 16, a memory which receives the output from the calculating apparatus to feed back it to the calculating circuit shown in FIG. 16 and a residue multiplying device comprising a control circuit for controlling the aforesaid operations. The control circuit can easily be formed by a counter for counting the clocks and ROM or the like having the address which stores the outputs.

Then, the operations of the structures shown in FIGS. 12, 16 and 17 will now be described. Then, a timing chart adaptable in a case where n=4 and p=2 will now be described.

```
#1: L out    |AB6|AB5|AB4|AB3|  0  |  0  |AB4|AB3|AB2|AB1|
    B in     |  B3|  B2|  B1|  B0|  0  |  B3|  B2|  B1|  B0|  0  |
    U (A3)   |AB7|AB6|AB5|AB4|  0  |AB5|AB4|AB3|AB2|  0  |
    P        |  0                    |S7;D6+S6                |
    E j-1    |  0                    |  E5|  E4|  E3|  E2|  0  |
    D out    |    | D7| D6| D5| D4| D3| D5| D4| D3| D2| D1|
    C out    |  0                |  0  |  0  | C5| C4|  0  |  0  |  0  |
    S out    |       |  0  | S7| S6| S5|  0  | S6| S5| S4| S3|  0  |

#2: L out                 |AB5|AB4|AB3|AB2|  0  |  0  |AB4|AB3|AB2|AB1|
    B in                  |  B3|  B2|  B1|  B0|  0  |  B3|  B2|  B1|  B0|  0  |
    U (A3)                |AB6|AB5|AB4|AB3|  0  |AB5|AB4|AB3|AB2|  0  |
    P                     |D7+S7                |S6;D5+S5           |
    E j-1                 |  E6|  E5|  E4|  E3|  0  |  E4|  E3|  E2|  E1|  0  |
    D out                 |    | D6| D5| D4| D3| D2| D4| D3| D2| D1|
    C out                 |  0  |  0  | C6| C5|  0  |  0  |  0  | C4| C3|  0  |  0  |
    S out                 |       | S7| S6| S5| S4|  0  | S5| S4| S3| S2|
```

An assumption is made that the initial state of each register in the structures shown in FIGS. 12, 16 and 17 is 0. Furthermore, another assumption is made that A3 is set to No. 1 PE and A2 is set to No. 2 PE shown in FIG. 16.

When, B is supplied for each m bits in an order B3, ..., B0 at first PE (j=1) from Bin, $A_3 \cdot B_{n-i}$ (i=1, ..., 4) are sequentially transmitted from the multiplier which receives the aforesaid value. For example, A3·B3 is the coefficient of $X^6$ in terms of the multiplication of a polynomial and as well as it includes the coefficient of $X^7$ since the aforesaid output is 2 m bits. Therefore, the output from the multiplier divided into upper and lower m digits is expressed by ABi (i=7, ..., 4) in FIG. 14 because outputs U of the upper m bits are the coefficients of $X^7$ to $X^4$. Since outputs Lout of the lower m bits are the coefficients of $X^6$ to $X^3$, it is expressed by ABi (i=6, ..., 3). The upper m-bit outputs U are supplied to the adders of the same PE, while the lower m-bit outputs Lout are temporarily delayed by one clock by an external register to be $D_{0,n-i}$, and then it is added by the adder of the No. 1 PE. Furthermore, this adder adds feedback output Lout supplied from a No. 2 PE to be described later to supply the result of this to a register $(R_{1,n-i})$. At this time, the lower m bits of $R_{1,n-i}$ ($i=1, \ldots, 4$) is, as $D_{1,n-i}$, transmitted to the next PE. On the other hand, $m+1$ bits or more, which are the carries, are transmitted as $S_{1,n-i}$ to pass through the next PE before it is transmitted to the second PE counted in the forward direction as $C_{1,n-i}$. Since $D_{1,n-i}$ and $C_{1,n-i}$ are the coefficients of $X^7$ to $X^4$ and $X^7$ to $X^5$ in terms of the coefficient of the polynomial, they are expressed by Dk ($k=7, \ldots, 4$) and Ck ($k=7, \ldots, 5$). In the aforesaid chart, other signals are as well as expressed by using the coefficient of the polynomial. Furthermore, $E_{0,n-i}$ expressing the residue is 0 and each $T_{n-i}$ ($i=1, \ldots, 4$) which is the timing of the residue is delayed by 2 clocks by the register before it is transmitted to the next PE.

When B is similarly supplied at the next PE ($j=2$) at $j=1$, $A_2 \cdot B_{n-i}$ ($i=1, \ldots, 4$) is transmitted from the multiplier for each upper and lower m bits. At this time, the lower m bits are, as Lout, fed back to the No. 1 PE. When the result of an addition of D7 and S7 supplied from the No. 1 PE is, as $R_{1,n}$, stored in a register P. Then, the value of $E_{j-1}$ obtained from Equation (1) is synchronized with $T_{n-i}$ so as to be sequentially transmitted from the ROM as $E_{1,n-i}$ to the adder. The result of this is, as $R_{2,n-i}$, supplied to the register so as to be transmitted to the next PE as Dk and Sk.

Since $p=2$, Dk and Sk are sequentially transmitted from the calculating apparatus shown in FIG. 16. Since the No. 1 PE is performing the calculations at the time of the commencement of the outputs of Dk and Sk, the outputs Dk and Sk are supplied to the memory to delay them. In this state, the calculation of the No. 1 PE is completed while delaying the output by one clock. Therefore, the one-clock delay is made in the memory to feed back Dk, Sk, $B_{n-i}$ and $T_{n-i}$ to the calculating apparatus shown in FIG. 16. Simultaneously, $A_1$ is set to the No. 1 PE shown in FIG. 16 and $A_0$ is set to the No. 2 PE.

When B is supplied at the next PE ($j=3$), $A_1 \cdot B_{n-i}$ ($i=1, \ldots 4$) is transmitted from the multiplier for each upper and lower m bits before U, Lout, Din and $E_{j-1}$ are added similarly to the former PE. Furthermore, $C_{1,n-i}$, which is the carry from the second former PE, is added, so that the calculations in the Algorithm I are performed. Since U, Lout, Din and $E_{j-1}$ respectively are m bits, the output from the adder is $m+2$ bits. Therefore, the register of $R_{j,n-i}$ must have $m+2$ bits. If the carry bit is 2 bits, the output from the adder is $m+2$ and is therefore not changed if it is added to the adder as a carry.

At the next PE ($J=4$), an operation similar to that when $j=3$ is performed. As a result, the value transmitted from the calculation apparatus shown in FIG. 16 is $R_n$.

EMBODIMENT 4 OF MODULAR MULTIPLYING CIRCUIT HAVING PE

Figure 18:
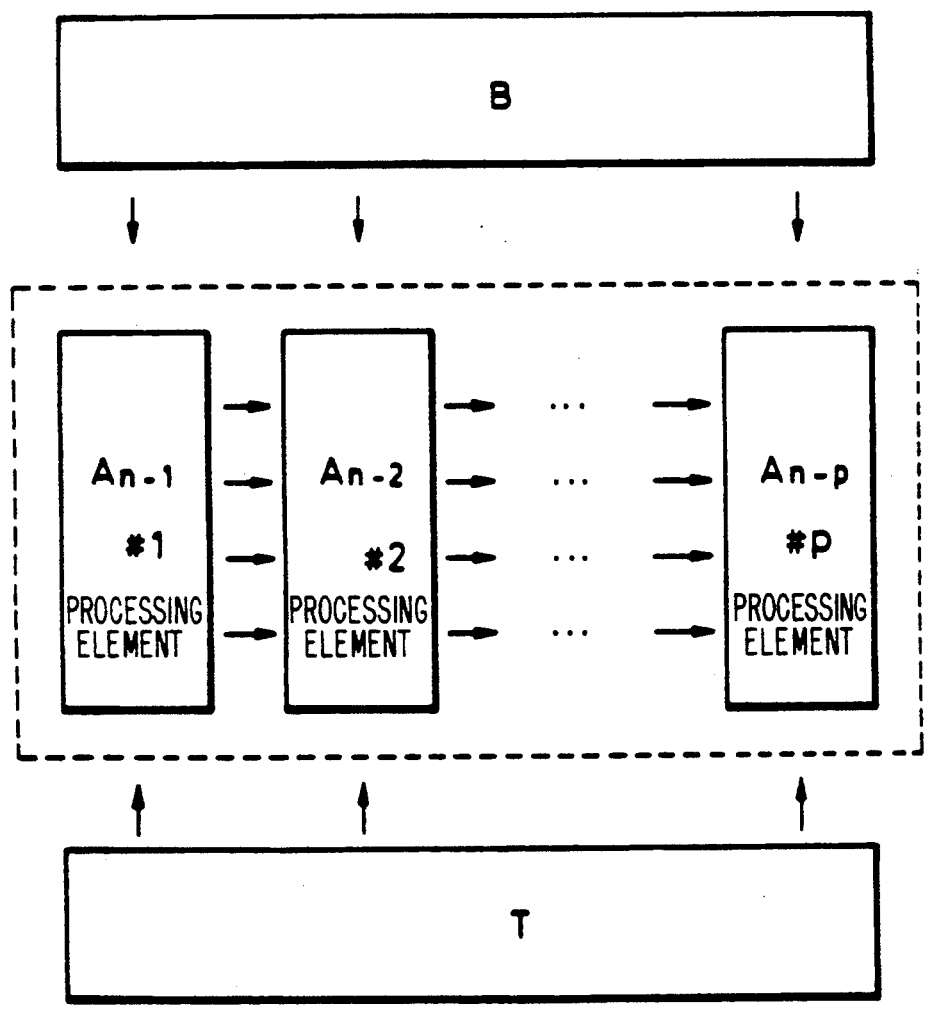

The four registers which receive Bin and Tin in the PE shown in FIG. 12 act only to delay the inputs Bin and Tin by 2 clocks. Therefore, the overall size of the circuit can be reduced by arranging the structure in such a manner that four output registers which concern B and T are omitted from the PE shown in FIG. 12 and the values of B and T are stored in different shift registers as shown in FIG. 18 to sequentially supply them to each PE at every three registers.

EMBODIMENT 5 OF MODULAR MULTIPLYING CIRCUIT HAVING PE

Figure 19:
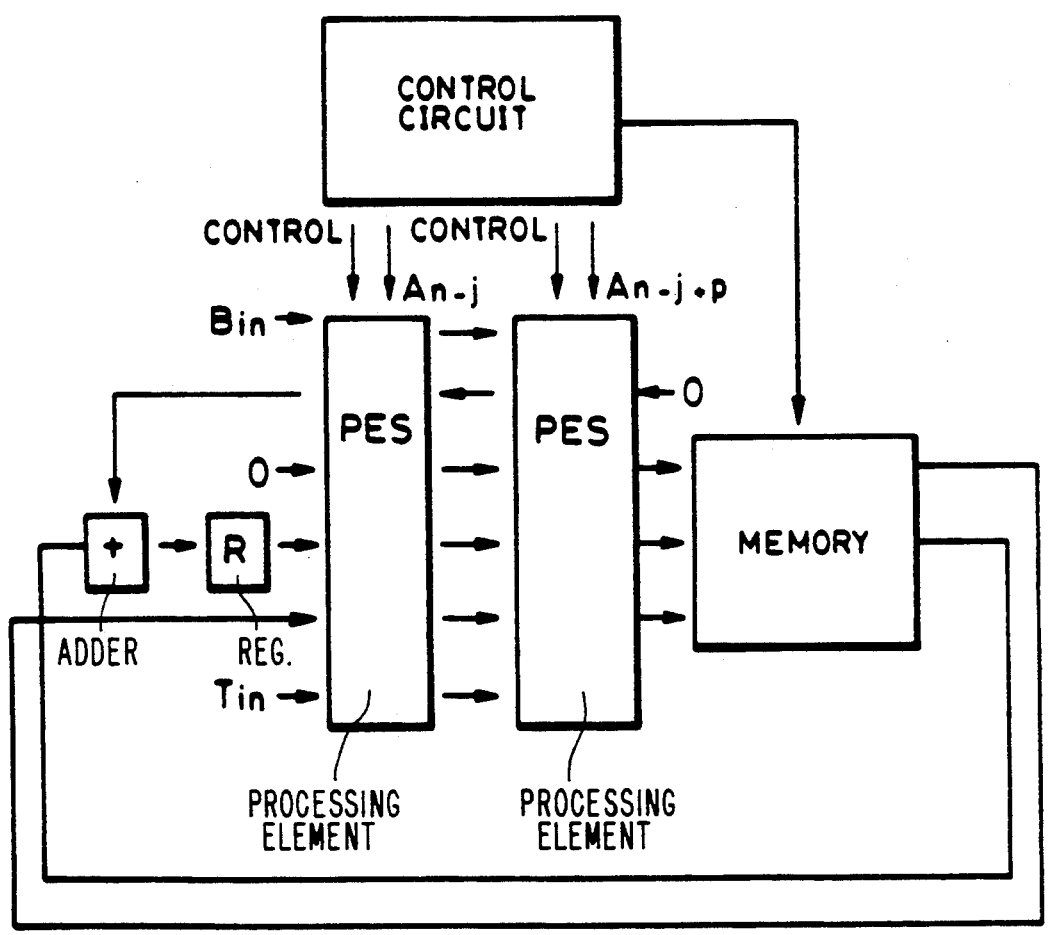

It is apparent that operations can be performed at high speed by longitudinally connecting a plurality of LSIs in the calculating apparatus shown in FIG. 16 and formed by the LSIs. In a case where the high speed operation is realized by using q LISs, it corresponds to multiply the value of p by q times in the Algorithm 2. A residue multiplication is performed by using two LSIs is shown in FIG. 19.

EMBODIMENT 6 OF MODULAR MULTIPLYING CIRCUIT HAVING PE

The present invention can be used in a residue multiplication on a Galois field as well as the circuit of residue-multiplying integers. In this case, the structure of the PE shown in FIG. 12 must be changed to that shown in FIG. 20.

Since there is no carry on the Galois field, signals denoting Cin, Cout, Sin and Sout and signals denoting Lout and Lin can be omitted and thereby the structure can significantly be simplified.

Figure 20:
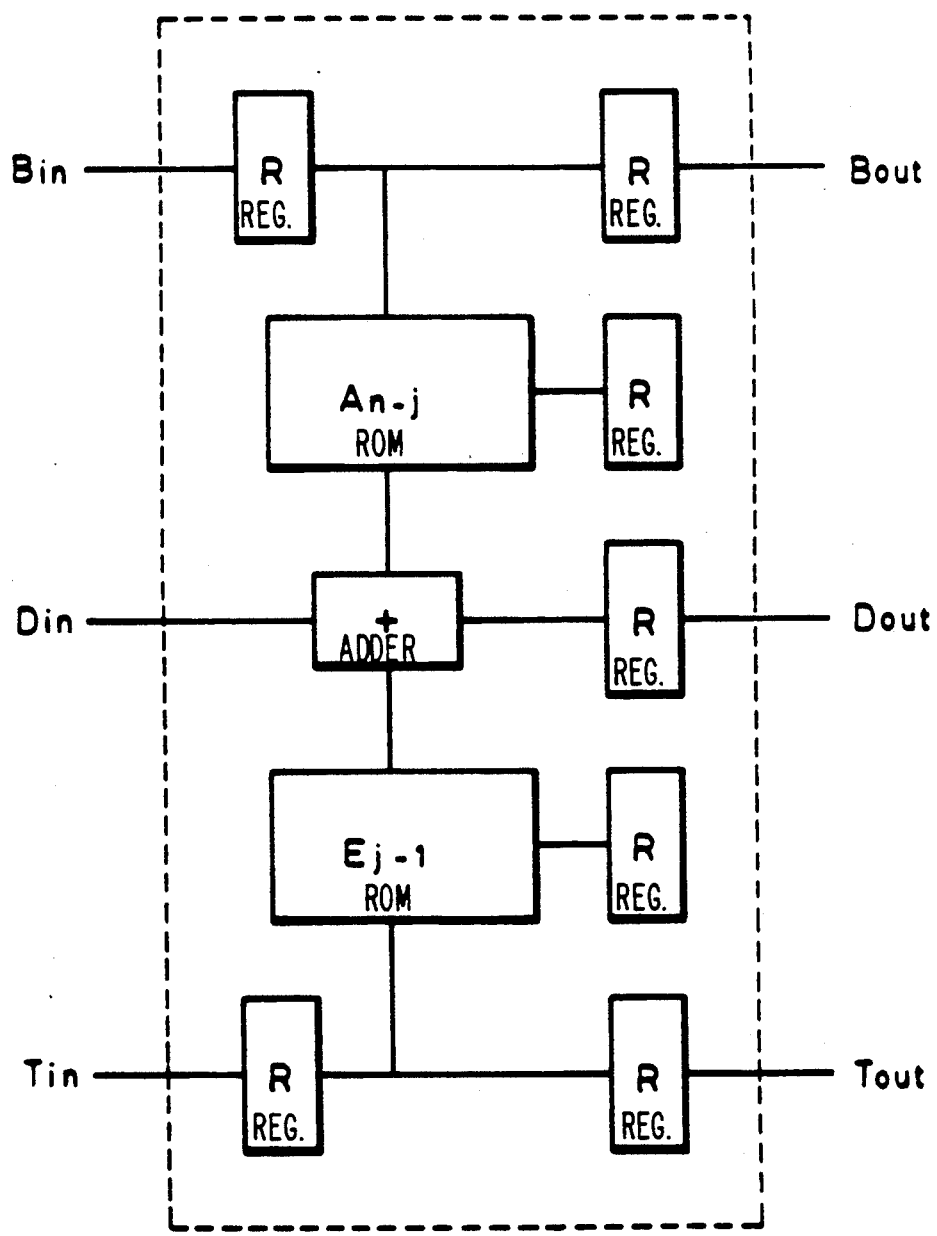
FIG. 20 illustrates a structural example of the PED for performing the modular multiplication on a Galois field.

Therefore, Bin and Bout, Tin and Tout, and Din and Dout of the PE shown in FIG. 20 are longitudinally connected, so that the residue multiplication on a Galois field can be performed similarly to the aforesaid residue multiplication of integers.

Although E is added as an alternative to $-Q \cdot N$ in the residue calculation according to this embodiment, the modular multiplication circuit of this system may be constituted by a conventional system in which a calculation $-Q \cdot N$ is performed.

STRUCTURE OF RSA CRYPTOGRAPHIC APPARATUS HAVING PE

The following methods of raising the processing speed in the RSA cryptorgraphic apparatus are known:

Encryption: the value of the cryptographic key e is made smallest
Decryption: the speed is raised by employing Chinese Reminder Theorem In a case where the RSA cryptographic apparatus is constituted on the basis of this method, the conventional modular multiplication circuit encounters a problem in that the cryptography and the decryptogrpahy cannot easily be executed by the same modular multiplication circuit because the multiplier and the number of digits of the divisor are different between the encryption and the decryption. Therefore, the modular multiplication is performed by a full software means or different circuits.

However, an advantage can be obtained from the modular multiplication circuit according to the present invention in that the encryption and the decryption can easily be realized by the same circuit because the number of the digits of the multiplier and that of the divisor are determined on the basis of the number of the operations as an alternative to the size of the circuit. The aforesaid number of the operations can easily be realized by changing the control performed in the control circuit because the number of the feedbacks to the calculating apparatus shown in FIG. 13 is different in the case of the encryption and the decryption.

Furthermore, the calculation of the RSA cryptography to be performed on the basis of the Chinese Reminder Theorem can basically be executed in parallel. Therefore, it is most suitable for use in the method according to the present invention in which the residue multiplication is executed by a plurality of calculating apparatus.

EMBODIMENT 7 OF MODULAR MULTIPLYING CIRCUIT HAVING PE

Then, a residue multiplication of $R = R \cdot B \mod N$ (where A is a k-bit integer and B is an m·n-bit integer) will be considered. A divided for each bit and B divided for each m bits can be expressed as follows:

$$A = A_{k-1} \cdot 2^{k-1} + A_{k-2} \cdot 2^{k-2} + \ldots A_1 \cdot 2 + A_0 \quad (10)$$

$$B = B_{n-1} \cdot X^{n-1} + B_{n-2} \cdot X^{n-2} + \ldots B_1 \cdot X + B_0 \quad (11)$$

Assumptions are made that $X = 2^m$ and the bit series of A and B obtained by dividing from the upper digit respectively are $A_{k-i}(i = k, \ldots, k)$, $B_{n-i}(i = 1, \ldots, n)$. In this case, it has been known that the residue multiplication can be performed by repeatedly subjecting $j = 1, \ldots, k$ to the following calculation:

$$R = R \cdot 2 + A_{k-j} B - Q \cdot N \quad (12)$$

where $Q = [R/N]$ and the initial value of R is 0.

In order to realize this calculation by a systolic array, the aforesaid calculation is expressed by the following algorithm:

---

Algorithm J
  $D_{0,n-i-1} = 0$; $C_{0,n-i-1} = 0$
  FOR j = 1 TO k
    FOR i = 1 TO n
      $R_{j,n-i} = 2 \cdot D_{j-1,n-i} + C_{j-2,n-i} + A_{k-j} \cdot B_{n-i} + E_{j,n-i}$
      $D_{j,n-i} = dw_{m-1}(R_{j,n-i})$
      $S_{j,n-i} = up_{m-1}(R_{j,n-i})$
      $C_{j-1,n-i} = S_{j,n-i}$
    NEXT
  NEXT
where
  $S_{j-1,n-1} \cdot X^n = Q_{j-1} \cdot N + E_{j-1}$, (13)
  $E_{j-1} = E_{j-1,n-1} X^{n-1} + , \ldots , + E_{j-1,1} \cdot X + E_{j-1,0}$ (14)
  $dw_{m-1}(Z)$: value smaller than $2^{m-1}$ digit of Z
  $up_{m-1}(Z)$: value obtained by dividing a value larger than $2^m$ of Z by $2^m$

---

Figure 21:
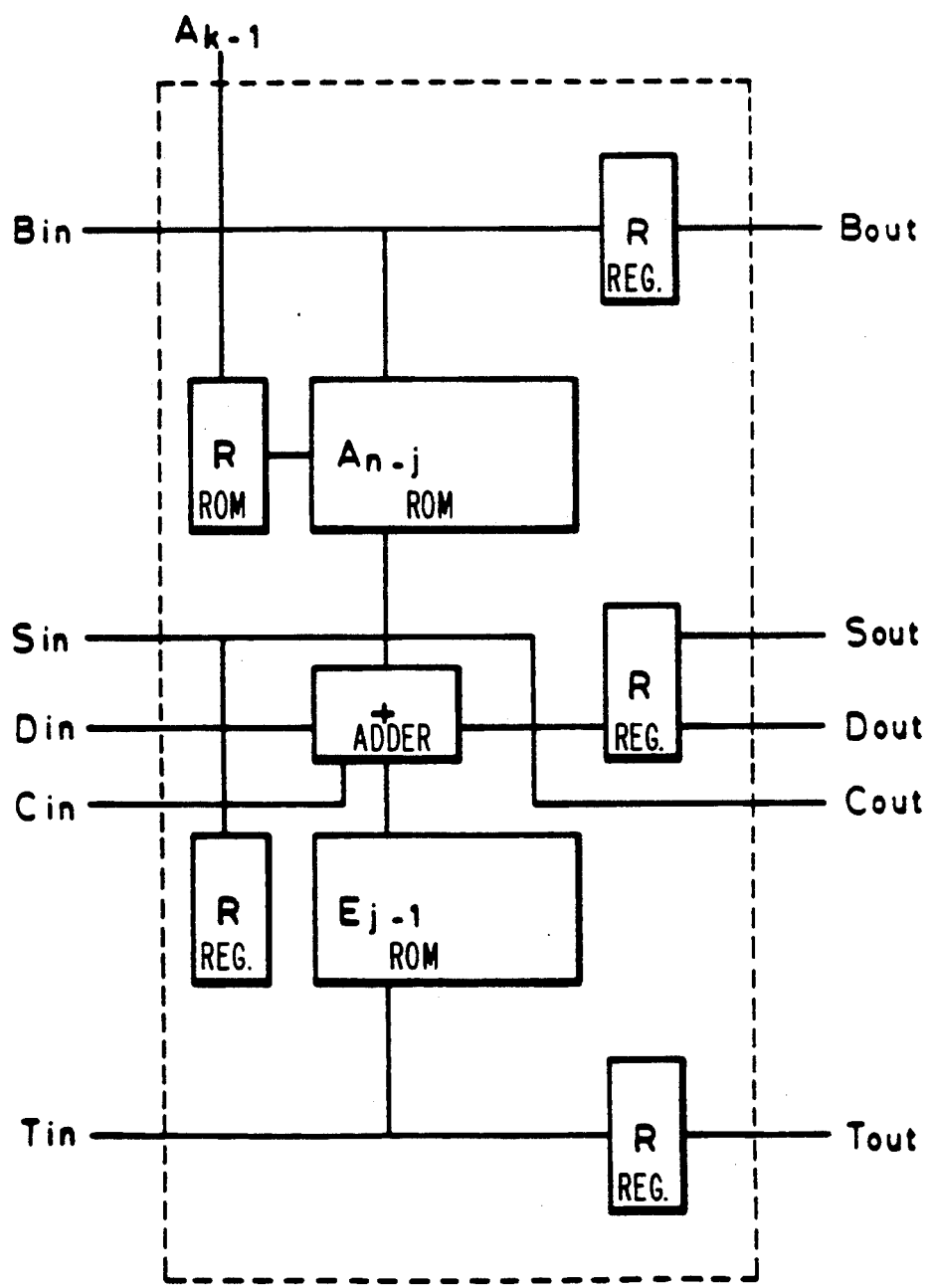
Figure 22:
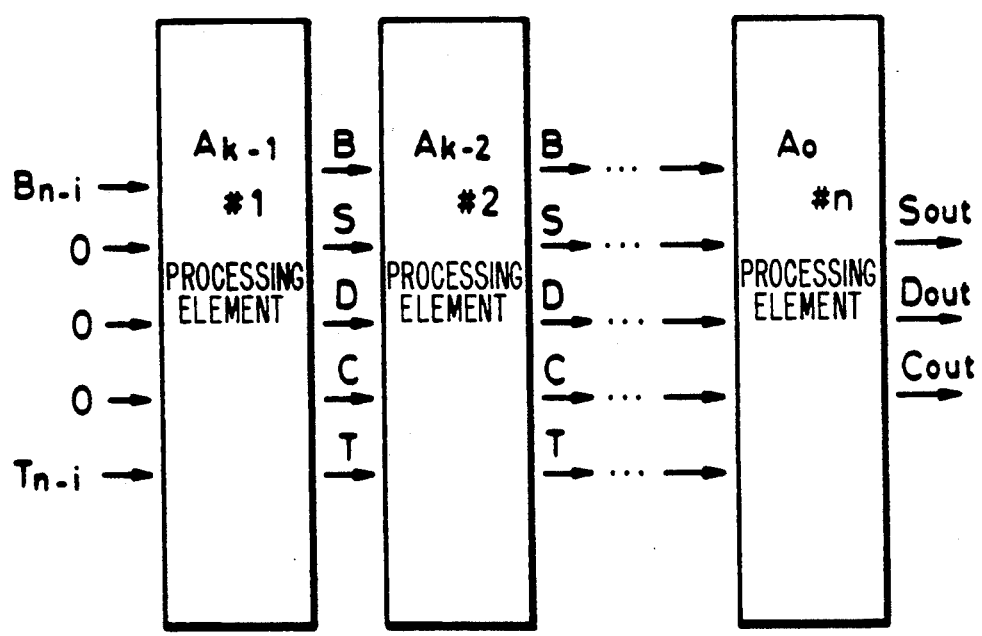

The aforesaid algorithm can be formed by circuits shown in FIGS. 21 and 22. The circuit shown in FIG. 22 is formed into a systolic array. The systolic array performs the calculation by a pipe line process by so-called PEs which are small and same functional blocks. The PE is formed as shown in FIG. 21.

In Algorithm 4, symbol i denotes a clock, j denotes the number in FIG. 22 which indicates the position of the PE disposed at j = 1 (No. 1) to j = n (No. n) from right to left. It is assumed that each PE shown in FIG. 22 has a value of $A_{k-j}$ (j = 1, ..., k) in the internal register thereof. The No. 1 PE receives $B_{n-i}$ (i = 1, ..., n) at the Bin thereof sequentially starting from the upper digit. Furthermore, it receives timing signal $T_{n-i}$ (i = ..., n) for the residue output from Tin in response to the aforesaid receipt of $B_{n-i}$ (i = 1, ..., n). They are respectively transmitted to the next PE through the corresponding Bout and Tout after are delayed by the registers. The structure is arranged in such a manner that 0 is set of Din, Sin and Cin of the No. 1 PE. The elements and the operation of the PE will be described.

(1) Multiplying Portion

The multiplying portion of $A_{k-j} \cdot B_{n-i}$ of each BE can easily be realized by m ANDs each transmitting $B_{n-i}$ only when $A_{k-j} = 1$ because $A_{k-j}$ is 1 bit.

(2) Arithmetic Portion

The adder transmits a carry of 2 bits because it is formed by a 4-input adder which receives output $A_{k-j} B_{n-i}$ from the multiplier, residue output $E_{j-1,n-i}$, $2 \cdot D_{j-1,n-i}$ and $C_{j-2,n-i}$. Therefore, each register which receives the output from the adder may be formed by a m+2 bit register. Furthermore, the values smaller than m-1 bits of the register $R_{j,n-i}$ of the j-th PE are, as $D_{j,n-i}$, transmitted to the next PE, while the values larger than m bits are, as $C_{j,n-i}$, transmitted to the same. However, $2 \cdot D_{j-1,n-i}$ can be realized by supplying $D_{j-1,n-i}$ to the adder by shifting it by one bit.

(3) Residue Portion

In order to simplify the description, $Q_{j-1}$ of values $S_{j-1,n-1}$, which are larger than N in terms of digits in place of the value, are obtained. Furthermore, $-S_{j-1,n-1} \cdot X_n + E_{j-1}$ is executed in place of executing $-Q_{j-1} \cdot N$, so that the residue calculation is performed. The reason for this lies in that $S_{j-1,n-1} \cdot X_n = Q_{j-1} \cdot N + E_{j-1}$ ($E_{j-1} < N$). Since $-S_{j-1,n-1} \cdot X_n$ is automatically performed due to the overflow of $S_{j-1,n-1}$, the residue calculation can be completed only by adding $E_{j-1}$. The addition of $E_{j-1}$ is performed by the following method: since the digit of $B_{n-i}$ and that of $E_{j-1,n-i}$ are the same in an equation which expresses $E_{j-1}$ at the j-th PE, $E_{j-1,n-i}$ (i = 1, ..., n) are sequentially transmitted at timing signal $T_{n-1}$ synchronized with $B_{n-i}$. Since $S_{j-1,n-1}$ is a three bit number and $T_{n-i}$ is a value denoting n−i, the $E_{j,n-i}$ output circuit can be realized by a ROM having an input of 3 + log (n−i) bits. Furthermore, a m+3 bit register and a selector for receiving and holding $S_{j-1,n-1}$ must be provided.

(4) Delaying Portion

It is formed by a register for transmitting the value of $B_{n-i}$ and $T_{n-i}$ in a pipe line manner. A register of m bits and log (n−i) bits must be provided for $B_{n-i}$ and $T_{n-i}$.

Then, a timing chart which illustrates the operation of the circuit shown in FIG. 22 in a case where an assumption is made that k = n = m = 4.

```
#1: AB1        |a3B3|a3B2|a3B1|a3B0|
    E1         | O                  |
    S1                | O | O | O | O  |
    D1=AB1            | D15| D11| D7| D3|

#2: Q2            | d18              |
    AB2           |a2B3|a2B2|a2B1|a2B0|
    E2            | E14| E10| E6 | E2 |
    S2                | S18| S14| S10| S6|
    D2=2·D1+AB2+E2    | D14| D10| D6 | D2|

#3: Q3:S2,D2      | S18, D17          |
    AB3           |a1B3|a1B2|a1B1|a1B0|
    E3            | E13| E9 | E5 | E1 |
    S3                | S17| S13| S9 | S5|
    D3=2·D2+AB3+E3    | D13| D9 | D5 | D1|

#4: Q4:S3,D3      | S17, D16          |
    AB4           |a0B3|a0B2|a0B1|a0B0|
    E4            | E12| E8 | E4 | E0 |
```

-continued

| S4 | | S16 | S12 | S8 | S4 |
| D4=2·D3+AB4+E4+C2 | | D12 | D8 | D4 | D0 |

The initial state of each register shown in FIGS. 21 and 22 is made to be 0.

When B is sequentially supplied for each m bits in an order B3, ..., B0 through Bin at the first PE (j=1), $a_3 \cdot B_{n-1}$ (i=1, ..., 4) are sequentially transmitted from the multiplier which receives the aforesaid input. Expressing the values of these outputs by Dx, D15, D11, D7 and D3 are transmitted from the No. 1 PE. Then, the meaning of Dx will now be considered. Since A can be decomposed for each bit, aj denotes the j+1 th bit of A. Furthermore, B can be decomposed for each 4 bits from m=4, Bi denotes bits $b_{4(i+1)-1}$ to $b_{4i}$ from the 4·(i+1) th digit of B to 4i+1 th digit. Therefore, $a_j \cdot B_i$ denotes the bit from the 4·(i+1)+j th digit to 4i+j+1 th digit, so that Dx is expressed by D4i+j in terms of the digit. The D4i+j is composed of 4 bits $d_{4(i+1)+j-1}$ to $d_{4i+j}$.

At the next PE (j=2), when B is supplied through Bin after one clock delay has been made, $a_2 \cdot B_{n-i}$ (i=4, ..., 1) is transmitted from the multiplier. Since first input D15 has been supplied from Din, residues E14 to E2 are transmitted in accordance with Equation (11) in response to timing signal $T_{n-i}$ starting from the uppermost digit d18. Also Ei is an output for each 4 bits. By adding the output denoting the multiplication, the output denoting the residue and input Din, the outputs of D14 to D2 and S18 to S6 are transmitted from the register. In this state, S18 to S6 are carries generated by the additions and are 2-bit values.

At the next PE (j=3), a calculation similar to that in the j=2 PE is performed in such a manner that the residue is generated from S18, which is the uppermost digit, and d17, which is the digit one bit lower, in accordance with Equation (10).

At the final PE (j=4), a calculation similar to that in the j=3 PE is performed in such a manner that the carry from the No. 2 PE is further added. The addition at No. 4 PE is, as shown in the first E12, from the 16-th digit to the 13-digit. Since the first carry from the No. 2 PE is a 2-bit carry S14, the addition is the 16-th digit and the 15-th digit. Therefore, the additions can be performed by the same adder. The output from this PE is the result of the residue multiplication. Furthermore, one PE shown in FIG. 21 is able to calculate $A_{k-j}$ in Equation (12).

EMBODIMENT 8 OF MODULAR MULTIPLYING CIRCUIT HAVING PE

In the systolic array, the operations to be performed in all of the PEs are the same and the input/output relationships between PEs are the same. Therefore, the systolic array is formed into an architecture in which the time-division process in the same circuit can easily be performed.

Figure 23:
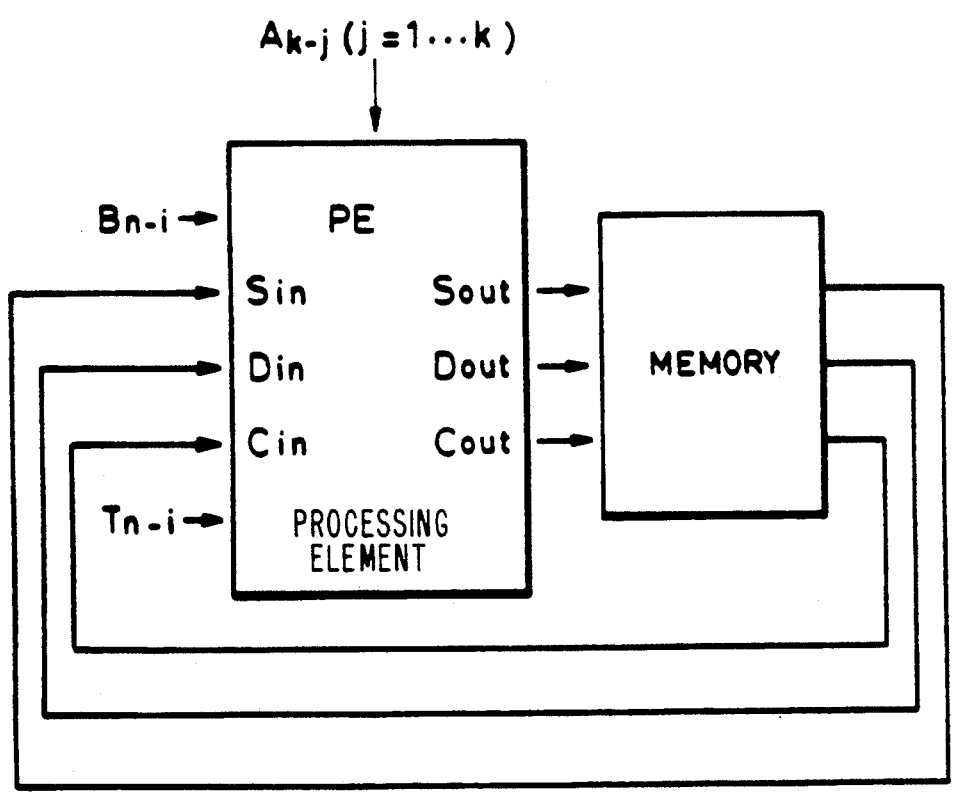

A most simple structure can be realized by one PE shown in FIG. 21 and a memory. FIG. 23 shows it which is operated as follows:

(1) First, $A_{k-1}$ is set to the PE, and $B_{n-i}$, $T_{n-i}$ (i=1, ..., n) are sequentially supplied to the PE. Since one PE performs the calculation of Equation (12) as described above, its output $R = A_{k-1} \cdot B$ is supplied to the memory. Furthermore, setting to PE is changed to $A_{k-2}$ immediately after the input of $B_{n-i}$, $T_{n-i}$ (i=1, ..., n) has been completed.

(2) R, which is the result of the previous calculation, fed back to the PE, and as well as $B_{n-i}$, $T_{n-i}$ are repeatedly supplied. As a result, $R = R \cdot X + A_{k-2} \cdot B - Q \cdot N$ is transmitted form the PE, this output is again stored in the memory.

(3) The setting to the PE is changed to $A_{k-j}$ (j=3, ..., k) and the operation of (2) is repeated.

Therefore, it can be said that the modular multiplication can be executed by the circuit shown in FIG. 23 in such a manner that the calculation to be performed by K PEs by one calculation is performed by using one PE by k times. If the structure is arranged in such a manner that p-pieces of PEs are connected in a pipe line manner and $A_{k-j}$ to $A_{k-j+p-1}$ are continuously set, the residue multiplication can be executed by repeating the calculation by p-pieces of PEs by k/p times. It can be considered that the size of the circuit (p-pieces of PEs) is traded off by the processing speed (k/p times of calculations). As described above, in the circuit formed by the systolic array, the size of the circuit and the processing speed can be easily traded off and thereby the size of the circuit can be reduced.

As described above, the modular multiplication circuit can be formed by the systolic array according to the aforesaid embodiment if only the residue multiplication is required. Then, the structure of the RSA cryptorgraphic apparatus will now be described. The modular multiplication circuit according to the aforesaid embodiment, one time, performs the modular multiplication. The result of the residue multiplication obtainable from this circuit includes a 2-bit carry bit for each m bits. In a case where the residue multiplication is repeated by using the result of the residue multiplication, the residue multiplication cannot be executed by the same circuit if the carry bit is not corrected. Therefore, in a case where the modular multiplication is repeated by using the previous result of the residue multiplication in the case of the RSA cryptography, it is a critical factor that the previous result of the residue multiplication must be easily and efficiently corrected.

The series Ac and Bc each having a carry bit and divided into A and B shown in Equations (10) and (11) and carry bit series a and b can be expressed as follows:

$$Ac = A + a \cdot X$$
$$a = a_{k-m} \cdot X^{n-2} + \ldots + a_{2 \cdot m} \cdot X + a_m$$
$$Bc = B + b \cdot X$$
$$b = b_{n-1} \cdot X^{n-2} + \ldots + b_2 \cdot X + b_1$$

Therefore, the residue multiplication $Rc = Ac \cdot Bc \mod N$ for Ac and Bc is expressed as follows:

EMBODIMENT 1 OF MODULAR MULTIPLYING CIRCUIT FOR RSA CRYPTOGRAPHIC APPARATUS $D_{0,n-i-1} = 0$; $C_{0,n-i-1} = 0$
FOR s = 1 TO k/m
  FOR c = 1 TO m
    FOR i = 1 TO n
      j = (s − 1) · m + c
P  $R_{j,n-i} = 2 \cdot dw_{m-1} (R_{j-1,n-i}) + C_{j-2,n-i}$
E        $+ A_{k-j} \cdot (B_{n-i} + b_{n-i}) + E_{j,n-i}$
A  $C_{j-1,n-i} = up_{m-1} (R_{j-1,n-i})$
    NEXT
  NEXT
    FOR i = 1 TO n
P  $R_{j,n-i} = dw_n (R_{j-,n-i}) + C_{j-2,n-i}$
E     = $a_{k-j} \cdot (B_{n-i} + b_{n-i}) + E_{j,n-i}$ -continued

```
B C_{j-1,n-i} = up_m (R_{j-1,n-i})
    NEXT
NEXT
    FOR i = 1 TO n
P R_{k,n-i} = R_{k,n-i} + C_{k-1,n-i}
E R_{k+1,n-i} = dw_m (R_{k,n-i}) + upm (R_{k,n-i-1})
C R_{k+2,n-i} = dw_m (R_{k+1,n-i})
            +up_m (R_{k+1,n-i-1}) + E_{k+1,n-i}
    NEXT
```

Figure 24:
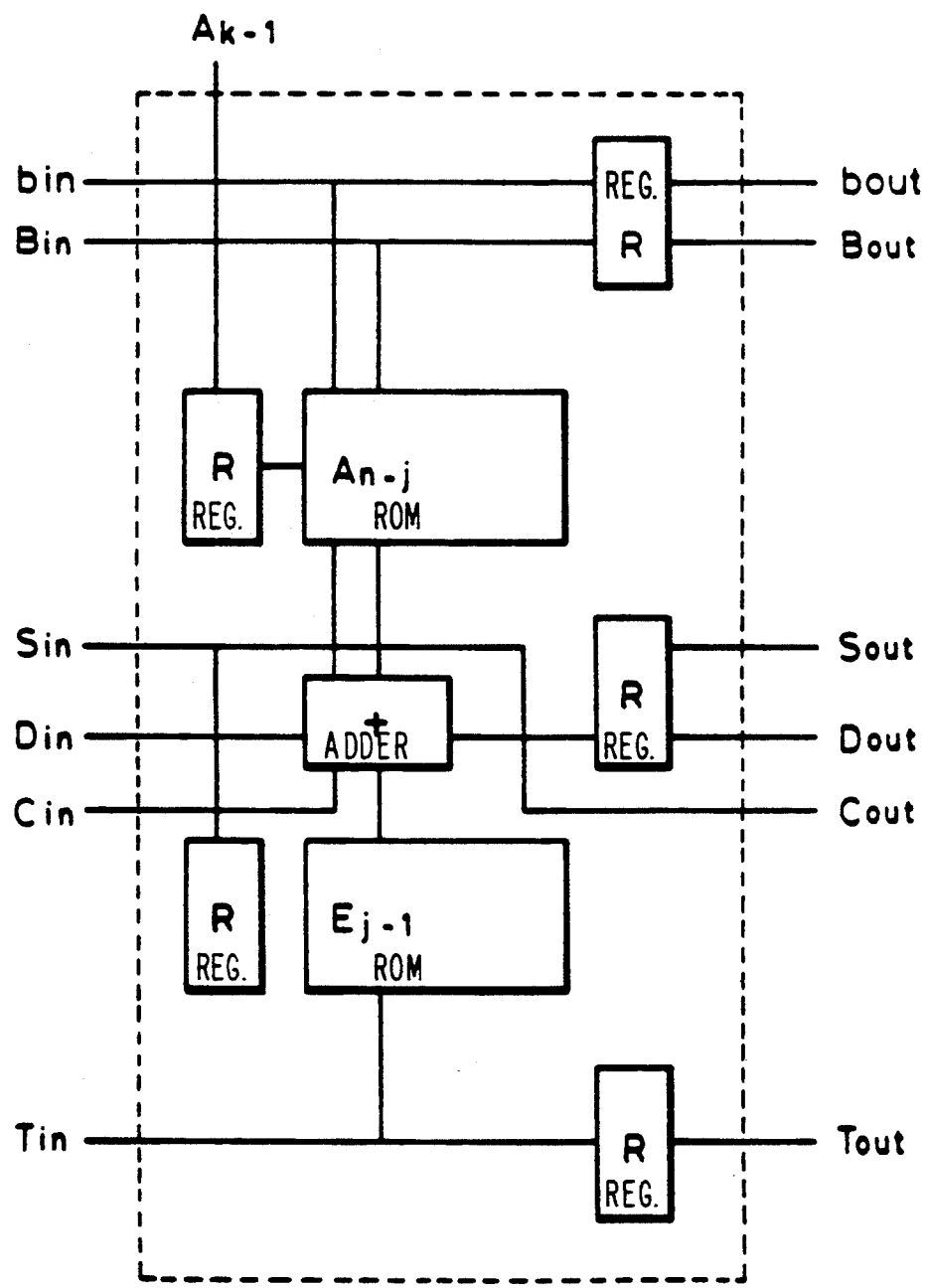
Figure 25:
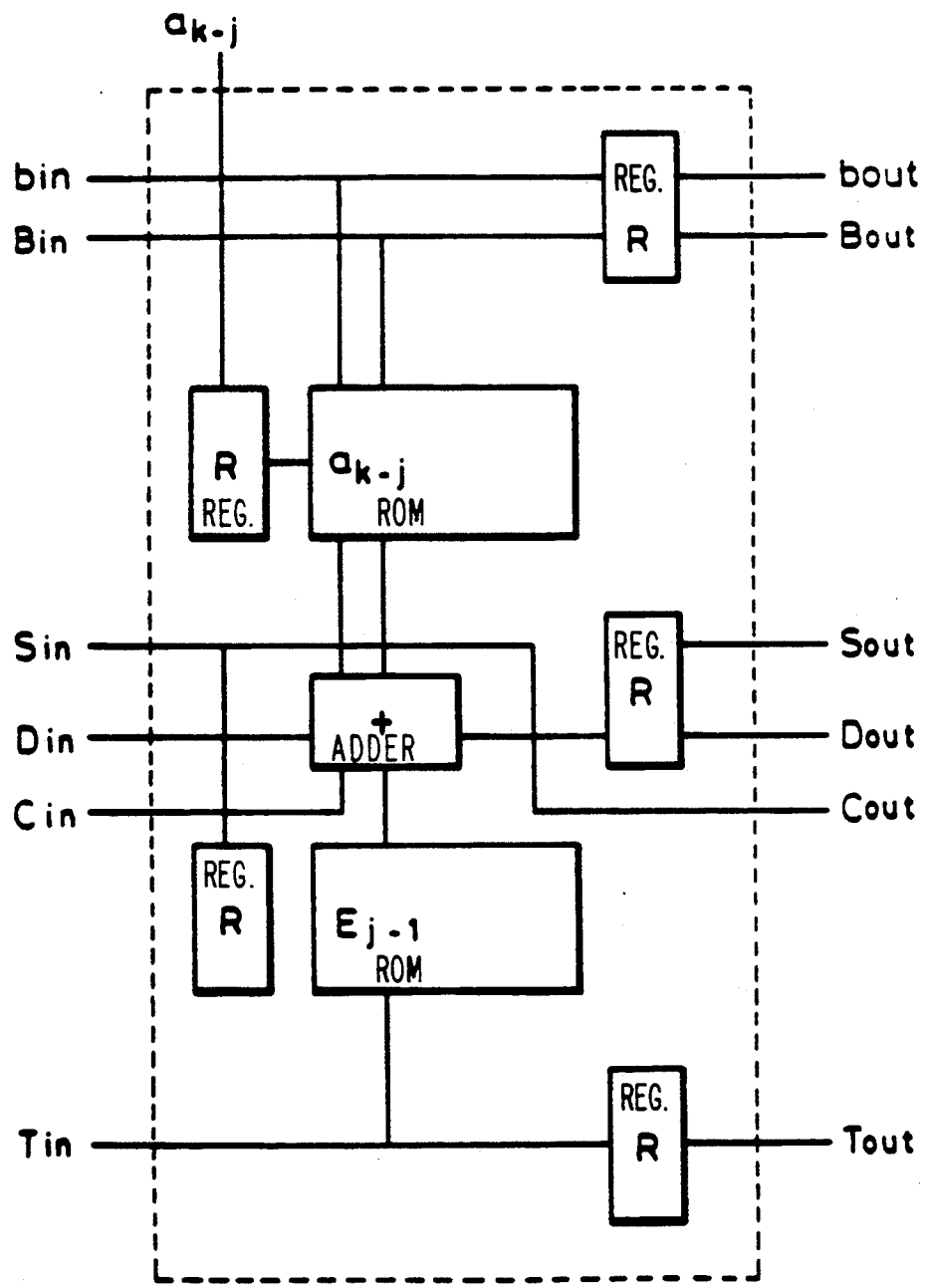
Figure 26:
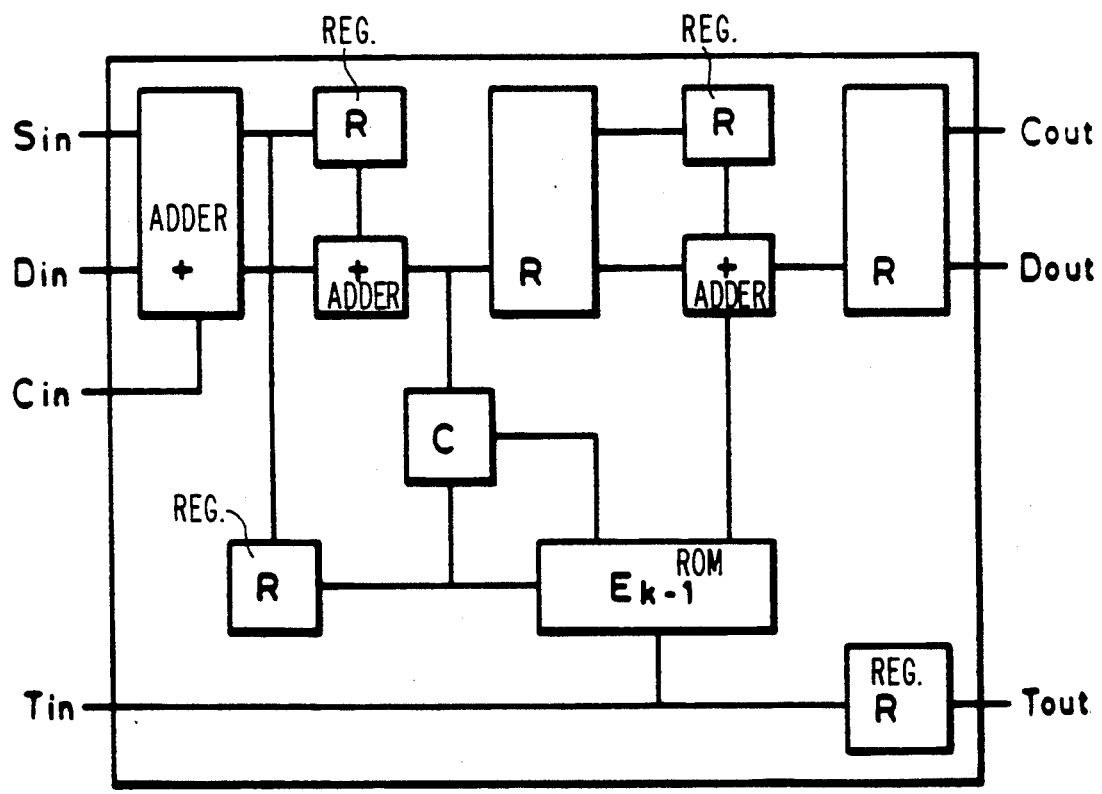

The process of each of PEA, PEB and PEC shown in the aforesaid algorithm can be realized by the PEs shown in FIGS. 24 to 26. Each PE is operated as follows:

PEC: A PE as shown in FIG. 25 is inserted into the final portion of the modular multiplication and the carry output from this PE is made 1 bit. The PE shown in FIG. 25 first adds outputs Dout, Sout and Cout from the former PE to obtain a value $R_{k,n-i}$. Then, value $C_{k,n-i}$ of $R_{k,n-i}$ which is larger than m+1 bits is delayed by the register to be added to a value $D_{k,n-i}$ which is smaller than m bits. As a result, carry $C_{k+1,n-i}$, which is the result of the aforesaid addition, is made to be 1 bit. However, the carry $C_{k,n-1}$ of the uppermost digit is stored in a different register. Then, residue $E_{k+1,n-1}$ of the uppermost digit is calculated from $C_{k,n-1}+C_{k+1,n-1}$, and then $D_{k+1,n-1}+C_{k+1,n-2}+E_{k+1,n-1}$, which is the uppermost digit of the modular multiplication, is previously calculated. In the case where the carry is generated in this uppermost digit, a residue of $1+C_{k,n-1}+C_{k+1,n-i}$ is transmitted to the calculation of $R_{k+2,n-i}$ which is the final result to discriminate/control in such a manner that there is not carry bit for the uppermost digit. A discrimination circuit for use in this operation is realized by a 3-bit ROM and an adder.

PEA: The input thorough Bin is converted from $B_{n-i}$ into $B_{n-i}+b_{n-i}$ in order to correct the carry for B. Therefore, $B_{n-i}$ and $b_{n-i}$ are simultaneously supplied to Bin as shown in FIG. 23 to calculate AND with $A_{n-j}$. Therefore, the number of AND circuits for the multiplying portion of the PE is m+1. The digit of the output denoting the AND $A_{n-j} \cdot b_{n-i}$ is the same as the digit of the lowermost bit of the output denoting AND $A_{n-j} \cdot B_{n-i}$.

PEB: In order to correct the carry for A, one PEB is inserted for each m pieces of PEA. Carry bit $a_{k-j}$ for A is set to PEB. Since the digit of $a_{k-j}$ is the same as that of $A_{k-j}$, which has been set to the former PE, the PEB performs the calculation $R = R + a_{k-j} \cdot B - Q \cdot N$ in which there is no carry in place of performing the operation shown in the equation. Therefore, output $R_{j-1,n-i}$ from the former PE must be processed in such a manner that outputs smaller than m bits are, as $D_{j-1,n-i}$, received through D'in and outputs larger than m+1 bits are, as $S_{j-1,n-i}$, received through S'in. Since carry $a_{k-1}=0$ from PEC to the upper most digit, the PEB for the carry for the uppermost digit can be omitted.

Figure 27:
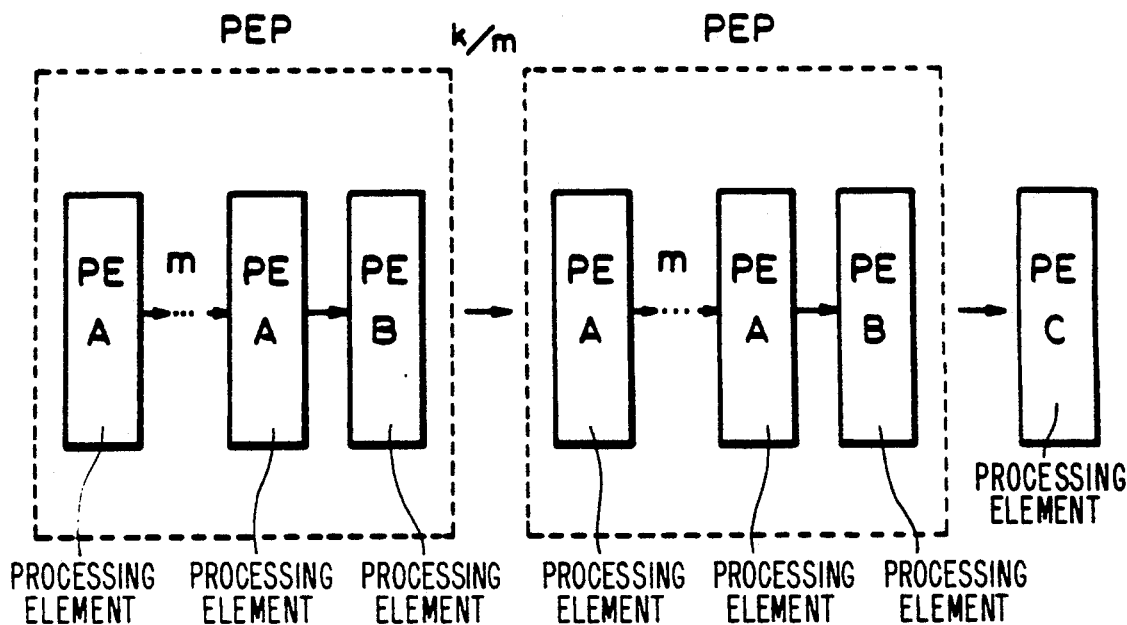

Therefore, the RSA cryptography apparatus can be realized by a systolic modular multiplication circuit structured as shown in FIG. 27. FIG. 27 illustrates a structure having one PEB for each m pieces of PEA and one PEC is used in place of PEB in the final portion of the residue multiplication. As a result, if an output from the structure shown in FIG. 26 is supplied to a circuit structured similarly to the systolic array shown in FIG. 27, a similar residue multiplication can be executed.

Figure 28:
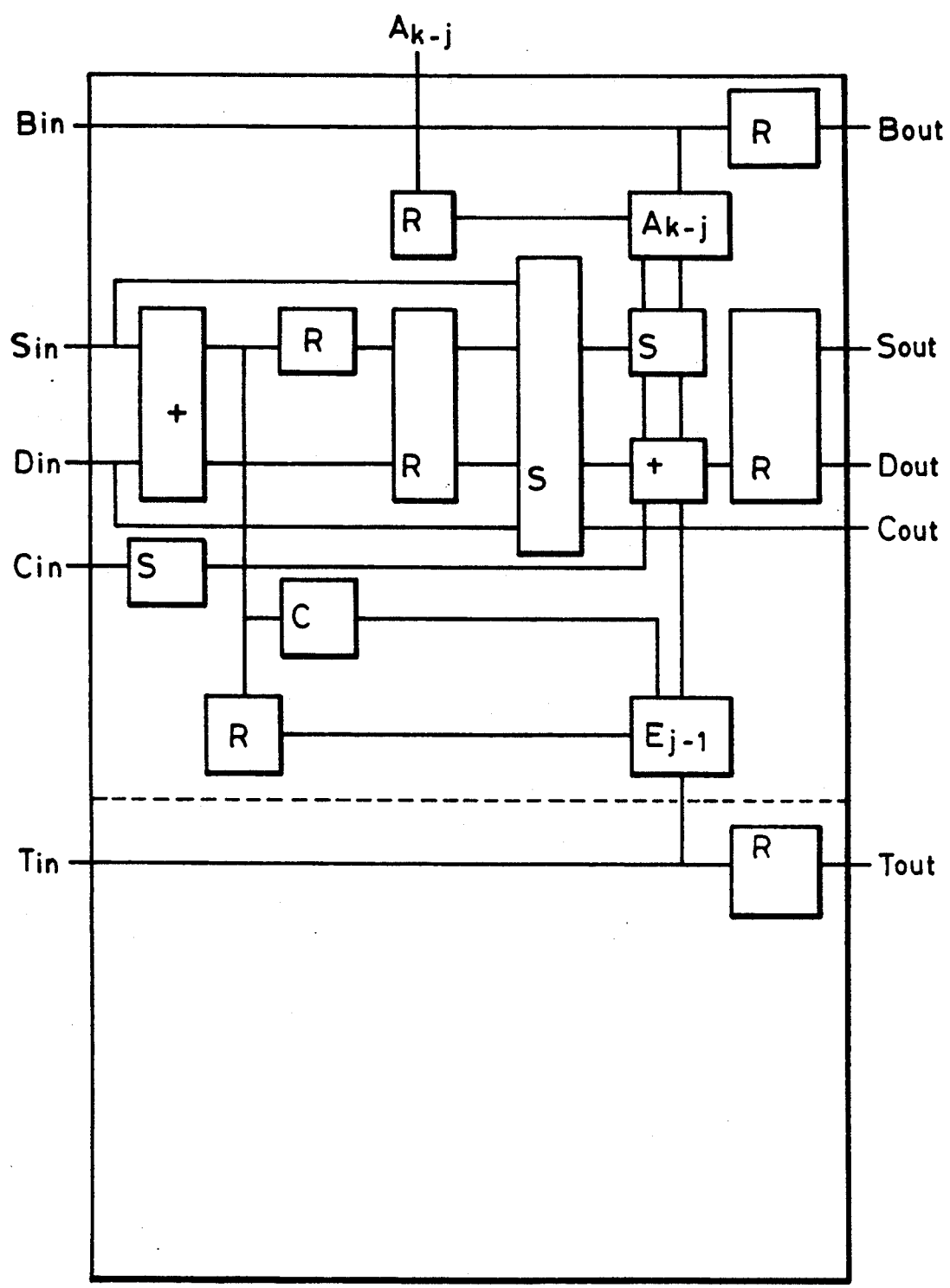

When the size of the systolic array is desired to be reduced, a circuit having one PE shown in FIG. 28 in which the functions of PEA to PEC including PE shown in FIG. 23 is switched by a selector can be employed, resulting a similarly-small modular multiplication circuit. Since the functions of PEA to PEC are similar to one another, a major portion of the circuits can be commonly used. Therefor, the size of the circuit for the PE shown in FIG. 28 can be reduced.

EMBODIMENT 2 OF MODULAR MULTIPLYING CIRCUIT FOR RSA CRYPTOGRAPHY APPARATUS

Encryption: the value of the cryptographic key e is made smallest

Decryption: the speed is raised by employing Chinese Reminder Theorem

In a case where the RSA cryptographic apparatus is constituted on the basis of this method, the conventional modular multiplication circuit encounters a problem in that the encryption and the decryption cannot easily be executed by the same modular multiplication circuit because the multiplier and the number of digits of the divisor are different between the cryptography and the decryptography. Therefore, the modular multiplication is performed by a full software means or different circuits. However, the modular multiplying method according to the present invention enables trading off to easily be performed by the size of the circuit and the number of operations. Therefore, the difference in the digit of the multipliers and that of the divisor can be overcome by changing the number of the operations and thereby the cryptography and the decryptography can easily be realized by the same circuit.

Furthermore, the calculation of the RSA cryptography to be performed on the basis of the Chinese Reminder Theorem can basically be executed in parallel. Therefore, it is most suitable for use in the method according to the present invention in which the modular multiplication is executed by a plurality of calculating apparatus.

As described above, the modular multiplication circuit and the RSA cryptorgraphic apparatus can be efficiently formed.

As is shown in the case where the size of the systolic array is reduced by means of the residue multiplying method according to the present invention, the modular multiplication circuit can be formed by p (an arbitrary number) pieces of PEs. Therefore, the method according to the present invention exhibits a characteristics that the structure can easily be formed into a circuit or a gate array. As a result, by collecting one to plural PEs into a chip (hereinafter called an "SRC (Systolic RSA)" before the chip is combined with an RAM such that it can be controlled with a program, an RSA cryptographic apparatus can be easily realized. The external program control can be flexibly provided by means of an ROM.

Figure 29:
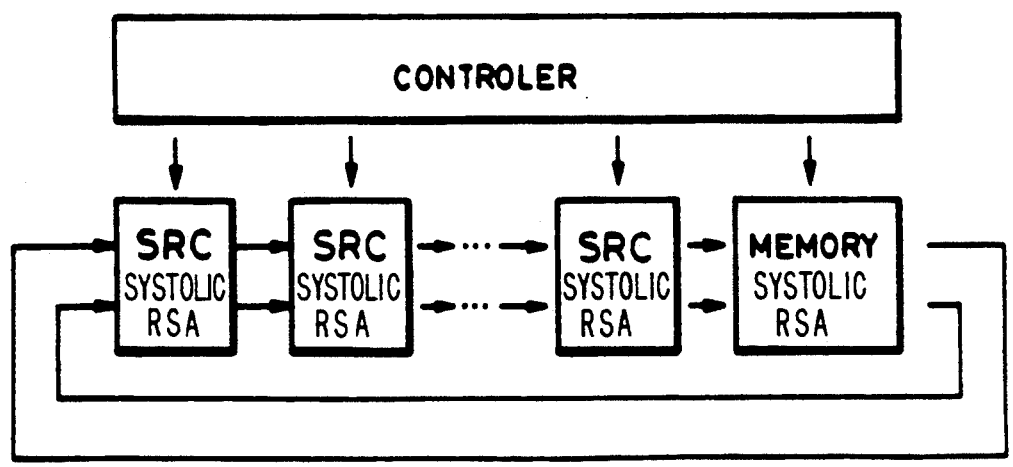
FIG. 29 illustrates a structural example of a multiprocessing circuit by means of an SRC (Systolic RSA Chip).

In a case where a high speed operation is required, a plurality of SRCs longitudinally connected are used as shown in FIG. 29, so that the number of the PEs can be increased. Then, the programming is switched over, so that the high speed operation can be easily realized. Therefore, the modular multiplying method according to the present invention can be adapted in a multiprocessing method.

Consequently, the RSA cryptography apparatus according to the present invention will cause the following effects to be obtained:

(1) Since the calculation to be performed in one PE are simple integer calculations, the modular multiplying algorithm according to the present invention can be formed into an apparatus by CPU or DSP. Therefore, in a case of a cryptographic system is used in low transmission speed systems such as IC cards or telephone lines, a simple RSA cryptography apparatus can be realized by using the CPU or DSP.

(2) The modular multiplication circuit according to the present invention can be formed by an arbitrary number of PEs. Hence, a high speed RSA cryptography process can be realized by one chip by using a C-MOS gate array of about 20K-gate or smaller which can be inexpensively produced by the present semiconductor technology.

(3) Since the multiprocessing process for the RSA cryptography by means of a plurality of chips can easily be realized, the processing speed can easily be raised in proportion to the number of chips.

(4) Even if the number of digits on the input value in the modular multiplication is excessively large, the necessity lies in only increasing the number of the PEs, that is, the number of chips. Therefore, a satisfactory expansion performance can be realized.

(5) When the RSA cryptography process is performed in a case where the number of digits is different between the cryptography and the decryptography, the size of the circuit and the number of the operations can easily be trade off in the modular multiplying method according to the present invention. Therefore, the decryptography and the cryptography can be easily realized by the same circuit by changing the number of operations even if there is a difference in the number of the digits of the multiplier or the divisor. Therefore, a satisfactory RSA cryptography apparatus can be constituted.

Since the residue is performed in such a manner that $E_{j-1}$ is obtained by means of the ROM in accordance with Equation (14) in order to simplify the structure, it is apparent that a high speed modular multiplication can be executed by a small circuit.

As described above, the calculating apparatus according to the present invention exhibits an effect to be obtained in that the modular multiplication circuit can be efficiently constituted by the systolic array.

The systolic array performs the modular multiplication in such a manner that a multiplication of large digit is decomposed into small digits (m bits) for each PE while dispensing with a discrimination whether or not $R<N$. Therefore, only the time taken for the signal to pass through a multiplying or a dividing ROM is required to process one clock. Therefore, a high speed pipe line process can be performed.

Furthermore, since the systolic array can be realized by a regular structure composed of the same simple PEs, a large scale circuit such as the vLSI can easily be constituted. In addition, the same control can be adapted to each PE and data is operated while being synchronized by the same clock, so that the systolic array can be easily realized.

Since the calculating apparatus comprising a plurality of PEs is free from a limitation present on the number of the PEs, the size of the circuit can be freely determined and thereby it can easily be formed into an LSI apparatus. Furthermore, the calculating apparatus according to the present invention can be realized by a regular structure composed of the same simple PEs. Hence, the VLSI can easily be employed. In addition, the same control can be adapted to each PE and data is operated while being synchronized by the same clock, so that the structure can easily constituted. In addition, even if the number of the digits of A and B are large or the processing speed is desired to be further raised, the necessity lies in only adding the PEs or the calculating apparatus. Therefore, a satisfactory expansion performance can be realized.

Since the calculation to be performed in the PE is a simple integer calculation, it can easily be realized by a microprocessor or a digital signal processor.

If m is increased, the size of the circuit is enlarged and the processing speed is raised. Therefore, the size of the circuit and the processing speed can be selected on the basis of the value of m. Furthermore, trading off with the processing speed can be easily performed. Therefore, an efficient modular multiplication circuit can be provided.

According to the present invention, an effect can be obtained in that the encryption/decryption apparatus for performing communication by means of the cryptography can be realized by a small circuit size.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A calculating apparatus for calculating a residue obtained by dividing a product of a first integer and a second integer by a third integer, comprising:

first input means for inputting a first bit data representing the first integer;

second input means for sequentially inputting a second bit data representing a second integer by a predetermined number of bits;

storage means for storing a third bit data;

multiplying means for sequentially multiplying the first bit data inputted by said first input means with the predetermined number of bits of the second bit data inputted by said second input means;

circuit means for outputting a residue obtained by dividing, a bit portion of the third bit data shifted by the predetermined number of bits, higher than the most significant bit of a fourth bit data representing the third integer supplied from said storage means, by the third integer; and adding means for adding a bit portion of the third bit data shifted by the predetermined number of bits, not higher than the most significant bit of the fourth bit data supplied from said storage means, a product supplied from said multiplying means and the residue outputted from said circuit means, said storage means storing a result of an addition by said adding means as a new third bit data.

2. A calculating apparatus according to claim 1 wherein said predetermined number of bits is 1 bit.

3. A calculating apparatus for calculating a residue obtained by dividing a product of a first integer and a second integer by a third integer, comprising:

first input means for inputting a first bit data representing the first integer by dividing the first bit data into bit portions each having a first predetermined number of bits;

second input means for sequentially inputting a second bit data representing the second integer by a second predetermined number of bits;

a plurality of storage means each for storing respective bit portions of a third bit data representing an intermediate result;

a plurality of multiplying means each for sequentially multiplying respective bit portions of said first bit data inputted by said first input means with the second predetermined number of bits of the second bit data sequentially inputted by said second input means;

a plurality of circuit means each for outputting respective bit portions of a residue obtained by dividing, a bit portion of the third bit data higher than the most significant bit of a fourth bit data representing the third integer, supplied from a predetermined one of said plurality of storage means, by the third integer; and a plurality of adding means each for adding a lower bit portion of a bit data shifted by the predetermined number of bits, stored in one of said plurality of storage means, a higher bit portion of a bit data stored in another one of said plurality of storage means, a product supplied form one of said plurality of multiplying means and one of the bit portion of the residue outputted from one of said plurality of circuit means, each of said storage means storing a result of the addition by said adding means as a new third bit.

4. A calculating a apparatus according to claim 3 wherein said second predetermined number of bits is 1 bit.

5. A calculating apparatus according to claim 3 wherein each of said plurality of circuit means has tables whereby respective bit portions of residues obtained by dividing the bit portion of the third bit data higher than the most significant bit of the fourth bit data corresponding to the third bit data can be read.

6. A calculating apparatus according to claim 3 wherein each of said plurality of multiplying means includes a logic gate circuit.

7. A calculating apparatus according to claim 3 wherein each of said multiplying means includes a memory for storing products of two bit data which can be read out in accordance with supplying the same two bit data.

8. A calculating apparatus according to claim 3 wherein the bit data of the lower bit portion which is received by said adding means is a result of a previous addition performed by said adding means and the bit data of the higher bit portion which is received by said adding means is a carry generated due to an addition performed by another adding means.

9. A calculating apparatus according to claim 3 wherein each of said plurality of said adding means performs simultaneously and adds the lower bit portion of a previous addition performed by said adding means and the carry generated due to a previous addition performed by another adding means.

10. A calculating apparatus according to claim 3 wherein each of a plurality of said adding means causes the result of said addition including a carry to be stored in the same storage means of a plurality of said storage means.

11. A calculating apparatus for calculating a residue obtained by dividing a product of integers A and B by an integer N including a plurality of processing elements, each of a plurality of said processing elements comprising:

first input means for inputting a first bit data representing a predetermined one of the bit portions according to the respective processing element, obtained by dividing the integer A into bit portions each having a first predetermined number of bits;

second input means for sequentially inputting a second bit data representing the integer B by a second predetermined number of bits through a preceding processing element;

storage means for storing a third bit data and outputting the third bit data to a following processing element;

third input means for receiving an output from the preceding processing element;

multiplying means for sequentially multiplying the first bit data inputted by said first input means with the predetermined number of bits of the second bit data inputted by said second input means;

circuit means for outputting a predetermined one of the bit portions according to the respective processing element, obtained by dividing a residue obtained by dividing the third bit data supplied from the storage means in the predetermined processing element, by the third integer; and adding means for adding a lower bit portion of the third bit data supplied from said storage means, a lower bit portion of a product supplied from said multiplying means, an output from said circuit means, a higher bit portion of the third bit data supplied from the storage means of the preceding processing element, and a higher bit portion of a product supplied from the multiplying means of the preceding processing element, said storage means storing a result of the addition by said adding means as a new third bit data.

12. A calculating apparatus according to claim 11 wherein a plurality of said processing elements constitute a systolic array.

13. A calculating apparatus according to claim 11 wherein the adding means of said plurality of said processing elements perform the additions simultaneously and add carries generated due to said additions at the next additions.

14. A communication method comprising the steps of:

obtaining bit data representing a cryptogram $C=M^e$ mod N for bit data representing information M. to be transmitted from given integers e and N by a repetition of modular multiplication of two integers while making N to be a modulo; and transmitting the bit data representing cryptogram C, said modular multiplication of the two integers comprising the steps of:

inputting a first bit data representing the first integer;

sequentially inputting a second bit data representing the second integer by a predetermined number of bits;

sequentially multiplying the first bit data with the predetermined number of bits of the second bit data;

obtaining a residue by dividing a bit portion of double of a third bit data in a register, higher than the most significant bit of a bit data representing the integer N, by the integer N;

adding a bit portion of the double of the third bit data in the register not higher than the most significant bit of the bit data representing the integer N, a result of the multiplication and the obtained residue to one another; and storing the result of said addition as a new third bit data in said register.

15. A communication method comprising the steps of:

receiving bit data representing a cryptogram C;

obtaining bit data representing information $M = C^d$ mod N for the received bit data representing cryptogram C from given integers d and N by a repetition of modular multiplication of two integers while making N to be a modulo said modulo multiplication of the two integers comprising steps of:

inputting a first bit data representing the first integer;

sequentially inputting a second bit data representing the second integer by a predetermined number of bits;

sequentially multiplying the first bit data with the predetermined number of bits of the second bit data;

obtaining a residue by dividing, a bit portion of double of a third bit data in a register, higher than the most significant bit of a bit data representing the integer N, by the integer N;

adding a bit portion of the double of the third bit data in the register not higher than the most significant bit of the bit data representing the integer N, a result of said multiplication, and the obtained residue to one another; and storing the result of the addition as a new third bit data in said register.

* * * * *

UNITED STATES PATENT AND TRADEMARK OFFICE
CERTIFICATE OF CORRECTION

PATENT NO. : 5,313,530
DATED : May 17, 1994
INVENTOR(S) : KEIICHI IWAMURA

Page 1 of 7

It is certified that error appears in the above-identified patent and that said Letters Patent is hereby corrected as shown below:

ON TITLE PAGE

In [56] References Cited, insert:
-- FOREIGN PATENT DOCUMENTS
DE A 3924344  2/1981  Germany --.

In [56] OTHER PUBLICATIONS:
line 2, "Polynomical" should read --Polynomial--;
line 10, "GF (2**n)"," should read --GF ($2^n$)",--;
line 13, "Algorith" should read --Algorithm--;
line 6, "7 C7/85)" should read --7 (7/85)--; and
line 7, "Implimentation" should read --Implementations--.

COLUMN 1

Line 34, "criptosystem" should read --cryptosystem--.

COLUMN 2

Line 2, "multiplication" should read --a multiplication--.
Line 17, "due" should be deleted.
Line 18, "provide clocks" should read --provide n clocks--
   and "steps" should read --step--.
Line 24, "of" should read --by--.

COLUMN 4

Line 6, "bit" should read --bits--.
Line 8, "is" should read --which is--.
Line 28, "is" should read --which is--.
Line 47, "a" should read --an--.

UNITED STATES PATENT AND TRADEMARK OFFICE
CERTIFICATE OF CORRECTION

PATENT NO. : 5,313,530
DATED : May 17, 1994
INVENTOR(S) : KEIICHI IWAMURA

It is certified that error appears in the above-identified patent and that said Letters Patent is hereby corrected as shown below:

COLUMN 5

Line 17, "simply," should read --simply--.
Line 47, "known that" should read --known,--.
Line 51, "for" should read --by--.

COLUMN 6

Line 39, "$R_j$ into to $R_{j,n-1}$" should read --$R_j$ into $R_{j,n-1}$--.
Line 58, "digit" should read --digits--.
Line 68, "and composed" should read --composed--.

COLUMN 7

Line 5, "sents" should read --sent--.
Line 34, "registor" should read --register--.

COLUMN 8

Line 10, "$C_{j,4-i}$," should read --$C_{j,4-1}$, and--.
Line 15, mod N, the" should read --mod N, and the--.

COLUMN 9

Line 20, "they" should read --then--.
Line 32, "into to" should read --into--.
Line 53, "digit" should read --digits--.

COLUMN 10

Line 20, "registor" should read --register--.
Line 27, "($R_{1,n-i}$: I=1, ..., n)." should read --($R_{1,n-i}$: i=1, ..., n).--.

UNITED STATES PATENT AND TRADEMARK OFFICE
CERTIFICATE OF CORRECTION

PATENT NO. : 5,313,530
DATED : May 17, 1994
INVENTOR(S) : KEIICHI IWAMURA

It is certified that error appears in the above-identified patent and that said Letters Patent is hereby corrected as shown below:

COLUMN 10

Line 39, "is" should read --are--.
Line 42, "is," should read --are,--.

COLUMN 11

Line 26, "dwm" should read --$dw_a$--.
Line 27, "upm" should read --$up_a$--.

COLUMN 12

Line 7, "arbitrary" should read --arbitrarily--.
Line 31, "multiplier but is performed by" should read --multiplier but--.
Line 59, "encriptograph" should read --encryptograph--.
Line 64, "encription" should read --encryption--.

COLUMN 13

Line 9, "exponentation:" should read --exponentiation:--.
Line 11, "exponentation" should read --exponentiation--.
Line 13, "exponentation" should read --exponentiation--.
Line 24, "in serial" should read --serially--.
Line 38, "serial" should read --series--.
Line 57, "are" should read --is--.
Line 64, "decripted." should read --decrypted.--.

COLUMN 14

Line 6, "invention," should read --invention;--.
Line 7, "encriptograph" should read --encryptograph--.

UNITED STATES PATENT AND TRADEMARK OFFICE
CERTIFICATE OF CORRECTION

PATENT NO. : 5,313,530
DATED : May 17, 1994
INVENTOR(S) : KEIICHI IWAMURA

It is certified that error appears in the above-identified patent and that said Letters Patent is hereby corrected as shown below:

COLUMN 14

Line 25, "+ $E_{j-1}$, O(7)" should read --+ $E_{j-1}$, O--.
Line 46, "a m*m-bit" should read --an m*m bit--.
Line 51, "a m+2 bit" should read --an m+2 bit--.
Line 59, "$S_{n,n-i}$." should read --$S_{j,n-i}$.--.

COLUMN 15

Line 43, "as" (second occurrence) should be deleted.
Line 66, "as" (second occurrence) should be deleted.

COLUMN 16

Line 39, "P." should read --P,--.
Line 40, "Then," should read --then--.

COLUMN 17

Line 20, "can" should read --can be--.
Line 66, "a m*m bit" should read --an m*m bit--.

COLUMN 18

Line 61, "as" (second occurrence) should be deleted.
Line 62, "2 m bits." should read --2m bits.--.

COLUMN 19

Line 8, "is," should read --are,--.
Line 11, "it is" should read --being--.
Line 16, "as" (second occurrence) should be deleted.

UNITED STATES PATENT AND TRADEMARK OFFICE
CERTIFICATE OF CORRECTION

PATENT NO. : 5,313,530
DATED : May 17, 1994
INVENTOR(S) : KEIICHI IWAMURA

It is certified that error appears in the above-identified patent and that said Letters Patent is hereby corrected as shown below:

COLUMN 19

Line 26, "P." should read --P,--.
Line 27, "Then," should read --then--.
Line 45, "(i=1, ... 4)" should read --(i=1, ..., 4)--.

COLUMN 20

Line 51, "decryptogrpahy" should read --decryptography--.

COLUMN 21

Line 13, "for" should read --by--.
Line 14, "for each m bits" should read --by each m bits--.
Line 46, "digit" should read --digits--.

COLUMN 22

Line 14, "a" should read --an--.
Line 40, "a" should read --an--.

COLUMN 24

Line 2, "as" (second occurrence) should be deleted.
Line 4, "form" should read --from-- and "PE, this" should read --PE, and this--.
Line 27, "torgraphic" should read --tographic--.
Line 67, "$dw_n (R_{j-,n-i})$" should read --$dw_n (R_{j-1,n-i})$--.

COLUMN 25

Line 38, "thorough" should read --through--.
Line 59, "upper most" should read --uppermost--.

UNITED STATES PATENT AND TRADEMARK OFFICE
CERTIFICATE OF CORRECTION

PATENT NO. : 5,313,530

DATED : May 17, 1994

INVENTOR(S) : KEIICHI IWAMURA

It is certified that error appears in the above-identified patent and that said Letters Patent is hereby corrected as shown below:

COLUMN 26

Line 7, "resulting" should read --resulting in--.
    Line 10, "Therefor," should read --Therefore,--.
    Line 47, "cryptorgraphic" should read --cryptographic--.
    Line 54, "characteristics" should read --characteristic--.
    Line 57, ""SRC (Systolic RSA)"" should read
        --"SRC (Systolic RSA)")--.

COLUMN 27

Line 6, "calculation" should read --calculations--.
    Line 34, "trade off" should read --traded off--.
    Line 36, "be" (second occurrence) should be deleted.
    Line 52, "of large digit" should read --of a large digit--.
    Line 61, "vLSI" should read --VLSI--.

COLUMN 28

Line 8, "can easily" should read --can easily be--.
    Line 29, "particularly," should read --particularity,--.
    Line 51, "dividing," should read --dividing--.

COLUMN 29

Line 19, "ing," should read --ing--.
    Line 29, "form" should read --from--.
    Line 36, "a" should be deleted.

UNITED STATES PATENT AND TRADEMARK OFFICE
CERTIFICATE OF CORRECTION

PATENT NO. : 5,313,530
DATED : May 17, 1994
INVENTOR(S) : KEIICHI IWAMURA

It is certified that error appears in the above-identified patent and that said Letters Patent is hereby corrected as shown below:

<u>COLUMN 32</u>

Line 1, "modulo said" should read --modulo, said--.
Line 10, "," should be deleted.

Signed and Sealed this

Fourteenth Day of February, 1995

BRUCE LEHMAN

Attest:

Attesting Officer

Commissioner of Patents and Trademarks